US011804777B2

(12) United States Patent
Chen et al.

(10) Patent No.: US 11,804,777 B2
(45) Date of Patent: Oct. 31, 2023

(54) POWER SUPPLY AND EMULATED CURRENT MODE CONTROL

(71) Applicant: Infineon Technologies Americas Corp., El Segundo, CA (US)

(72) Inventors: Keng Chen, Acton, MA (US); James R. Garrett, Windham, NH (US)

(73) Assignee: Infineon Technologies Austria AG, Villach (AT)

( * ) Notice: Subject to any disclaimer, the term of this patent is extended or adjusted under 35 U.S.C. 154(b) by 30 days.

(21) Appl. No.: 17/496,804

(22) Filed: Oct. 8, 2021

(65) Prior Publication Data

US 2023/0113610 A1    Apr. 13, 2023

(51) Int. Cl.
*H02M 1/36* (2007.01)
*H02M 3/158* (2006.01)

(52) U.S. Cl.
CPC ............. *H02M 3/158* (2013.01); *H02M 1/36* (2013.01); *H02M 3/1588* (2013.01)

(58) Field of Classification Search
CPC ....................... H02M 1/36; H02M 3/155–1588
See application file for complete search history.

(56) References Cited

U.S. PATENT DOCUMENTS

| | | | |
|---|---|---|---|
| 2003/0214354 A1* | 11/2003 | Chen .................. | H02M 3/1584 330/124 D |
| 2004/0145845 A1 | 7/2004 | Schuellein | |
| 2010/0066338 A1* | 3/2010 | Moussaoui ......... | H02M 3/1588 323/288 |
| 2014/0097818 A1 | 4/2014 | Wiktor et al. | |
| 2016/0149504 A1 | 5/2016 | Quigley | |
| 2020/0313557 A1* | 10/2020 | Egan ..................... | H02M 3/158 |
| 2022/0069810 A1* | 3/2022 | Desai ..................... | H03K 3/037 |
| 2022/0103069 A1* | 3/2022 | Chiang ................. | H02H 9/001 |

FOREIGN PATENT DOCUMENTS

CN           105790564 A         7/2016

OTHER PUBLICATIONS

Extended Search Report, EP 22 19 9698, pp. 1-12, dated Feb. 9, 2023.

* cited by examiner

*Primary Examiner* — Peter M Novak
(74) *Attorney, Agent, or Firm* — Armis IP Law, LLC

(57) ABSTRACT

A power supply includes a storage component to store an output current value representative of a magnitude of output current supplied by an output voltage of a power converter to power a load. The power supply further includes an offset reference generator and a controller. The offset reference generator produces an offset reference signal, the output current value being offset by the offset reference signal. The controller controls generation of the output voltage of the power converter as a function of the offset output current value with respect to a threshold signal (value). Additionally, the controller is configured to detect a startup mode of a power converter operative to convert an input voltage into an output voltage. During the startup mode, the controller: i) produces a threshold signal having a magnitude that varies over time, and ii) controls operation of switches in the power converter as a function of the threshold signal while the power converter is operated in a diode emulation mode. Implementation of the startup mode monotonically increases a magnitude of the output voltage without dips.

36 Claims, 15 Drawing Sheets

POWER SUPPLY AND EMULATED CURRENT MODE CONTROL

BACKGROUND

Conventional power supplies may include one or more DC to DC converters to produce a respective output voltage to power a load.

One type of DC-to-DC converter is a single-stage power converter system. As its name suggests, in the single-stage power converter system, each phase includes a single power converter to convert an input voltage such as 12 V DC (Volts Direct Current) into a respective target output voltage such as 1 volt DC to power a load.

One type of power converter is a buck converter. A so-called Constant ON Time (COT) switching buck regulator has fixed ON-time and uses off-time Pulse Width Modulation (PWM) to regulate an output voltage. In general, to maintain an output voltage within a desired range, the buck converter compares the magnitude of a generated output voltage to control respective switch circuitry (such as a control switch and synchronous switch).

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

Embodiments herein provide novel and improved generation of an output voltage via a power supply that powers a load.

For example, in one embodiment, a power supply includes a storage component to store an output current value representative of a magnitude of output current supplied by an output voltage of a power converter to power a load. The power supply further includes an offset reference generator and a controller. The offset reference generator produces an offset reference signal; the output current value is offset by the offset reference signal. The controller controls generation of the output voltage of the power converter as a function of the offset output current value with respect to a threshold signal (such as threshold level, threshold setting, threshold value, etc.).

In one embodiment, as further discussed herein, the threshold signal is generated by a master power converter phase and used by one or more slave power converter phases to control generation of the output voltage. For example, the threshold signal controls timing (such as duration of time) in which high side switch circuitry in each of the power converter phases (master or slave) is activated to collectively generate the output voltage.

In further example embodiments, the power supply includes a comparator. The comparator produces one or more control signals based on a comparison of a summation of the output current value and the offset reference signal with respect to the threshold signal. The controller operation of switches in the power converter via the control signals.

The storage component can be implemented in any suitable manner. In one embodiment, the storage component is a capacitor. Alternatively, the storage component is a digital component storing data. Any or all of the components as discussed herein can be implemented via analog or digital circuitry.

In yet further example embodiments, the offset reference signal produced by the reference voltage generator is a ramp voltage having a magnitude that varies over time. In such an instance, the stored output current value is therefore offset by different amounts over time. In one embodiment, the offset output current value emulates a magnitude of the output current supplied by the output voltage to the load.

In further example embodiments, the output current value stored in the storage component represents a measured valley magnitude of the output current at an instant in time. In one embodiment, the instant in time occurs at a transition between i) deactivating synchronous switch circuitry of the power converter, and ii) activating control switch circuitry in the power converter to convert an input voltage into the output voltage.

In still further example embodiments, in a similar manner as previously discussed, the magnitude of the offset reference signal varies over time. The controller can be configured to vary a slew rate of the offset reference signal (such as a ramp signal) depending on a magnitude of a switching frequency of controlling switches in the power converter that convert an input voltage into the output voltage.

Further embodiments herein include a threshold signal generator (a.k.a., threshold level generator, threshold signal generator, etc.). In one embodiment, the threshold signal generator generates the threshold signal (such as threshold value, threshold level, etc.) as function of a difference between a setpoint reference voltage and a magnitude of the output voltage. The controller controls a duration of activating high side switch circuitry in the power converter based on a comparison of the offset output current value with respect to the threshold signal.

The power converter can be configured to include any suitable components to convert an input voltage into and output voltage. In one embodiment, the power converter includes a control switch (such as control switch circuitry) and a synchronous switch (synchronous switch circuitry).

A magnitude of the output current can be monitored in any suitable manner. For example, in one embodiment, the output current value stored in the storage component is derived from monitoring a voltage of a node of the power converter coupling the control switch to the synchronous switch. The voltage is used as a basis in which to determine or derive the output current value.

In still further example embodiments, the power converter includes multiple power converter phases. In one embodiment, the output current represents first output current supplied by a first power converter phase to the load. The power supply (i.e., apparatus, hardware, circuit, etc.) as discussed herein includes an adjustor to adjust or apply compensation to a magnitude of the output current value stored in the storage component based on a magnitude of output current supplied by a second power converter phase to the load. In one embodiment, the adjusted magnitude of the output current value is generated to equalize the magnitude of the output current supplied by the first power converter phase with respect to the magnitude of the output current supplied by the second power converter phase.

In further example embodiments, the power converter is a first power converter phase and the controller of the first power converter phase is a first controller. The first controller and/or first power converter phase communicates the threshold signal and first output current status information to a second controller (associated with a second power converter phase). The second controller controls operation of the second power converter phase.

In one embodiment, the first output current status information indicates an average magnitude of the output current supplied by the first power converter phase to the load. In further example embodiments, the first controller produces the first output current status information as a function of the threshold signal.

In still further example embodiments, the first output current status information associated with the first power converter phase is based on a summation of the threshold signal and a first signal indicating the average magnitude of the output current supplied by the first power converter phase.

The second controller produces second output current status information based on the threshold signal and a second signal; the second signal indicates an average magnitude of output current supplied by the second power converter phase to the load. To equalize the output current of the second power converter phase to the output current of the first power converter phase, the second power converter phase controls the average magnitude of output current supplied by the second power converter phase as a function of the first output current status information and the second output current status information. In one embodiment, the second controller controls operation of the second power converter phase based at least in part on a difference between the first signal and the second signal. In one embodiment, the difference provides compensation to the second power converter phase to equalize the output currents of the first power converter phase and the second power converter phase.

These and other more specific embodiments are disclosed in more detail below.

Embodiments herein further provide novel and improved generation of an output voltage via a power supply that powers a load.

More specifically, embodiments herein include an apparatus comprising a controller. The controller first detects a startup mode of a power converter operative to convert an input voltage into an output voltage. During the startup mode, the controller produces a threshold signal having a magnitude that varies over time. Further, during the start mode, the controller controls operation of switches in the power converter as a function of the threshold signal while the power converter is operated in a diode emulation mode.

In one embodiment, further during the startup mode, the controller operates the power converter in an open loop control mode in which the controller operates the power converter to produce the output voltage independent of a magnitude of the output voltage. Subsequent to the startup mode, the controller operates the power converter in a closed loop mode in which the controller operates the power converter to produce the output voltage based on the magnitude of the output voltage with respect to a setpoint reference signal.

Further example embodiments herein include, via the controller, subsequent to the startup mode, transitioning the power converter from operation in the diode emulation mode to operation in a continuous conduction mode to convert the input voltage into the output voltage.

In yet further example embodiments, the controller monitors zero crossing conditions of the power converter to prevent output current supplied by the output voltage from reversing direction during the startup mode of operating in the diode emulation mode.

Still further example embodiments herein include, via the controller, during the startup mode, monitoring occurrence of a zero crossing condition with respect to an output current supplied by the output voltage of the power converter to a dynamic load and continuing operation of the power converter in the diode emulation mode in response to detecting occurrence of one or more zero crossing conditions.

Yet further embodiments herein include, during the startup mode, monitoring occurrence of a zero crossing condition with respect to an output current supplied by the output voltage of the power converter to a dynamic load; and transitioning operation of the power converter from the diode emulation mode to a continuous conduction mode in response to detecting no zero respective crossing condition in one or more switching control cycles.

In still further example embodiments, the controller monotonically ramps a magnitude of the output voltage from a first magnitude to a second magnitude during the startup mode. The generated threshold signal is shared by each of multiple power converter phases of the power converter to control conversion of the input voltage into the output voltage. The controller transitions high side switch circuitry in the power converter from ON states to an OFF states based on comparison of an emulated peak output current signal of the power converter with respect to the threshold signal. In one embodiment, the emulated peak current signal is an emulation of actual output current supplied by the output voltage of the power converter to a load.

In accordance with further embodiments, the controller activates a switch in a master power converter phase of the power converter to communicate the threshold signal from the master power converter phase to at least one slave power converter phase of the power converter.

In still further example embodiments, the controller controls switching of switches in the power converter between ON and OFF states at a fixed switching frequency to convert the input voltage into the output voltage. Alternatively, the controller can be configured to control switching at a variable switching frequency.

As previously discussed, the power converter can be configured to include multiple power converter phases, each of which is operable to generate a portion of output current from the power converter as a function of the generated threshold signal (shared threshold level) and a respective magnitude of output current supplied by a respective power converter phase to a dynamic load.

Still further example embodiments herein include, via the controller, storing an output current value representing an amount of output current supplied by the power converter to a load. The controller then applies an offset to the stored output current value to produce the threshold signal. Further, the controller supplies the threshold signal to multiple power converter phases of the power converter for shared use to convert the input voltage into the output voltage.

These and other more specific embodiments are disclosed in more detail below.

Note that any of the resources implemented in system as discussed herein can include one or more computerized devices, controllers, mobile communication devices, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to produce an output voltage. The instructions, when executed by computer processor hardware, cause the computer processor hardware (such as one or more co-located or disparately located processor devices or hardware) to: obtain an output current value representative of a magnitude of output current supplied by an output voltage of a power converter to power a load; produce an offset reference signal, the output current value being offset by the offset reference signal; and control generation of the output voltage of the power converter as a function of the offset output current value with respect to a threshold value.

Another embodiment includes a computer readable storage medium and/or system having instructions stored thereon to produce an output voltage. The instructions, when executed by computer processor hardware, cause the computer processor hardware (such as one or more co-located or disparately located processor devices or hardware) to: detect a startup mode of a power converter converting an input voltage into an output voltage; and during the startup mode: i) produce a threshold signal having a magnitude that varies over time, and ii) control operation of switches in the power converter as a function of the threshold signal while the power converter is operated in a diode emulation mode.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
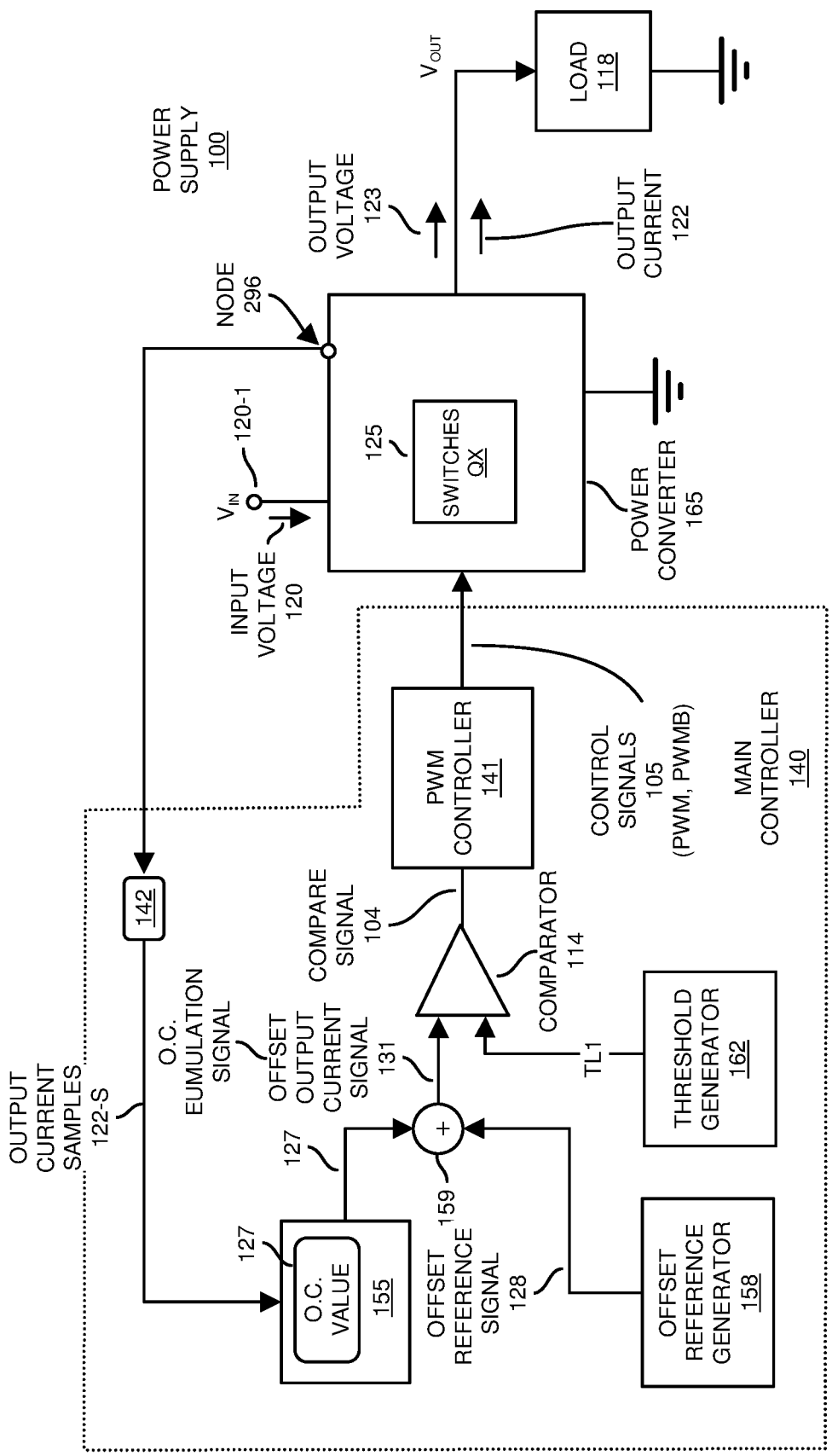
FIG. 1 is an example diagram illustrating a power supply implementing output current emulation and power conversion according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, a power supply includes a storage component to store an output current value representative of a magnitude of output current supplied by an output voltage such as at an instant of time of a power converter powering a load. The power supply further includes an offset reference generator and a controller. The offset reference generator produces an offset reference signal, the output current value being offset by the offset reference signal to produce an output current emulation signal representative of a respective output current of the power converter. In one embodiment, as its name suggests, the output current emulation signal is an emulation of the actual output current supplied by the output voltage to the load. Via comparison of the offset output current value (a.k.a., output current emulation signal) with respect to a threshold signal (such as threshold value), the controller regulates a magnitude of the output voltage of the power converter.

In one embodiment, as further discussed herein, the threshold signal is generated by a master power converter phase and used by one or more slave power converter phases to control generation of the output voltage. For example, the threshold signal controls timing (such as duration of time) in which high side switch circuitry in each of the power converter phases (master or slave) is activated to collectively generate the output voltage.

Now, with reference to the drawings, FIG. 1 is an example diagram illustrating a power supply including an output current emulator and power converter according to embodiments herein.

As shown in this example embodiment, the power supply 100 includes multiple components such as main controller 140, power converter 165, and load 118. The main controller 140 includes any number of components such as storage component 155, offset reference generator 158, summer 159, comparator 114, and PWM (pulse width modulation) controller 141. The power converter 165 includes output current monitor 142 and any number of switches Qx.

In this example embodiment, the power supply 100 receives the input voltage 120 (such as a DC input voltage) from input voltage source 120-1.

As its name suggests, the power converter 165 converts the input voltage 120 into the output voltage 123 (such as a DC voltage) that powers the dynamic load 118 (such as one or more electronic circuits, components, etc.).

Power converter 165 can be configured as any suitable circuit, logic, assembly, etc., that converts the received input voltage 120 (such as a DC or other suitable type voltage) into the output voltage 123 supplied to the dynamic load 118. The output voltage 123 supplies corresponding output current 122 to the dynamic load 118.

In further example embodiments, the main controller 140 supports an emulation mode in which the main controller 140 produces an output current emulation signal 131, which has its name suggests emulates the actual output current 122 supplied by the power converter 165 to the load 118.

In one embodiment, the main controller 140 generates the control signals 105 as a function of the magnitude of the output current emulation signal 131. For example, the control signals 105 control operation (states) of switches 125 (a.k.a., Qx) in the power converter 165 to convert the input voltage 120 to the output voltage 123.

More specifically, the power converter 165 includes output current monitor 142. As its name suggests, the output current monitor 142 monitors a magnitude of the actual output current 122 supplied by the power converter 165 to the load 118. Monitoring of the output current can be achieved in any suitable manner.

The output current monitor 142 provides output current samples 122-S to the main controller 140. In one embodiment, the main controller 140 stores one or more of the output current samples 122-S as output current value 127 in storage component 155. In one embodiment, as further discussed herein, the stored output current value 127 is a detected valley (minima peak) associated with the monitored output current 122.

As further shown, the offset reference generator 158 of the main controller 140 produces a respective offset reference signal 128.

Summer 159 receives both the output current value 127 and the offset reference signal 128 and produces a respective output current emulation signal 131 representing a summation of the output current value 127 and the offset reference signal 128.

The controller 140 further includes comparator 114 and threshold generator 162. Threshold generator 162 produces threshold signal TL1 (a.k.a., threshold value). Based on comparison of the summation signal 131 to the threshold signal TL1, the comparator 140 produces compare signal 104 supplied to the PWM controller 141.

In one embodiment, as further discussed herein, the threshold signal TL1 is generated by a master power converter phase and used by one or more slave power converter phases to control generation of the output voltage. For example, the threshold signal controls timing (such as duration of time) in which high side switch circuitry in each of the power converter phases (master or slave) is activated to collectively generate the output voltage.

The PWM controller 141 uses the compare signal 104 as a basis in which to produce control signals 105. The control signals 105, as further discussed herein, control operation of the switches 125 and conversion of the input voltage 120 into the output voltage 123 powering load 118.

Accordingly, embodiments herein include a storage component 155 to store an output current value 127 representative of a magnitude of the output current 122 supplied by the output voltage 123 to power the dynamic load 118. The main controller 140 includes an offset reference generator 158 and a pulse width modulation controller 141. The offset reference generator 158 produces the offset reference signal 128; the output current value 127 is offset by the offset reference signal 128. The pulse width modulation controller 141 controls generation of the output voltage 123 of the power converter 165 as a function of the output current emulation signal 131 (a.k.a., output current value 127 offset by the offset reference signal 128) with respect to a threshold signal TL1.

Figure 2:
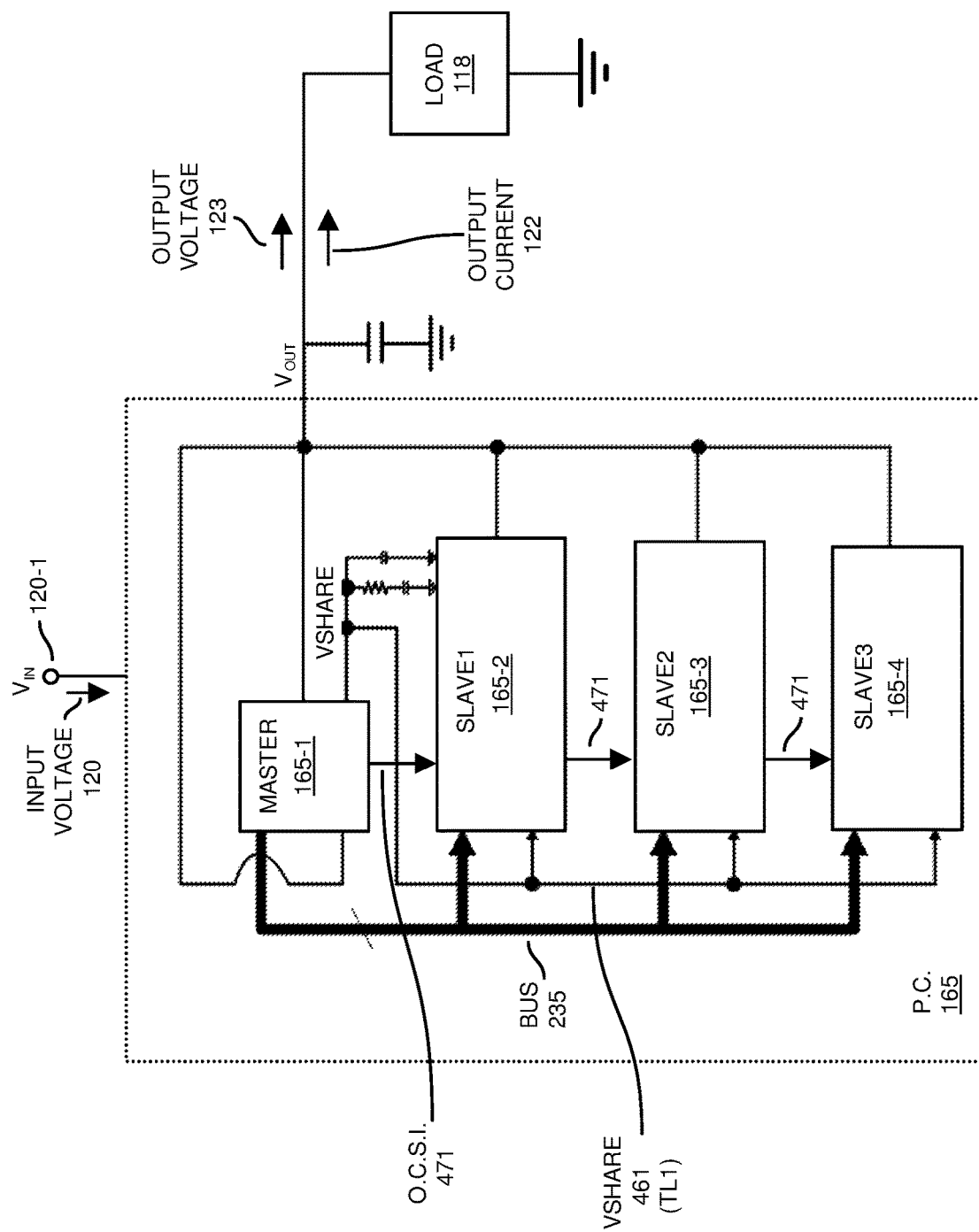
FIG. 2 is an example diagram illustrating a multiple-phase power converter and generation of an output voltage according to embodiments herein.

FIG. 2 is an example diagram illustrating a multiple-phase power converter and generation of an output voltage according to embodiments herein.

As shown in FIG. 2, the power converter 165 can be configured to include any number of power converter phases.

For example, in one embodiment, the power converter 165 includes power converter phase 165-1 (master phase), power converter phase 165-2 (first slave power converter phase), power converter phase 165-3 (second slave power converter phase), and power converter phase 165-4 (third slave power converter phase).

As further shown, the power supply 100 includes bus 235 (any suitable communication link such as supporting conveyance of one or more signals) enabling the master power converter phase 165-1 to communicate any information to each of the slave power converter phases 165-2, 165-3, and 165-4.

As further discussed herein, the master VSHARE signal 461 (a.k.a., threshold signal TL1) is communicated to each of the other slave power converter phases such as over a respective electrically conductive path or the bus 235.

As further discussed herein, the master power converter phase communicates output current status information 471-M to each of the other slave power converter phases such as over a respective electrically conductive path or the bus 235.

The parallel operation of the power converter phases 165-1, 165-2, 165-3, and 165-4 results in conversion of the input voltage 120 into the output voltage 123 powering load 118. Each of the power converter phases includes a main controller 140 to control operation of a respective power converter phase to produce the output voltage 123 to power the load.

Figure 3:
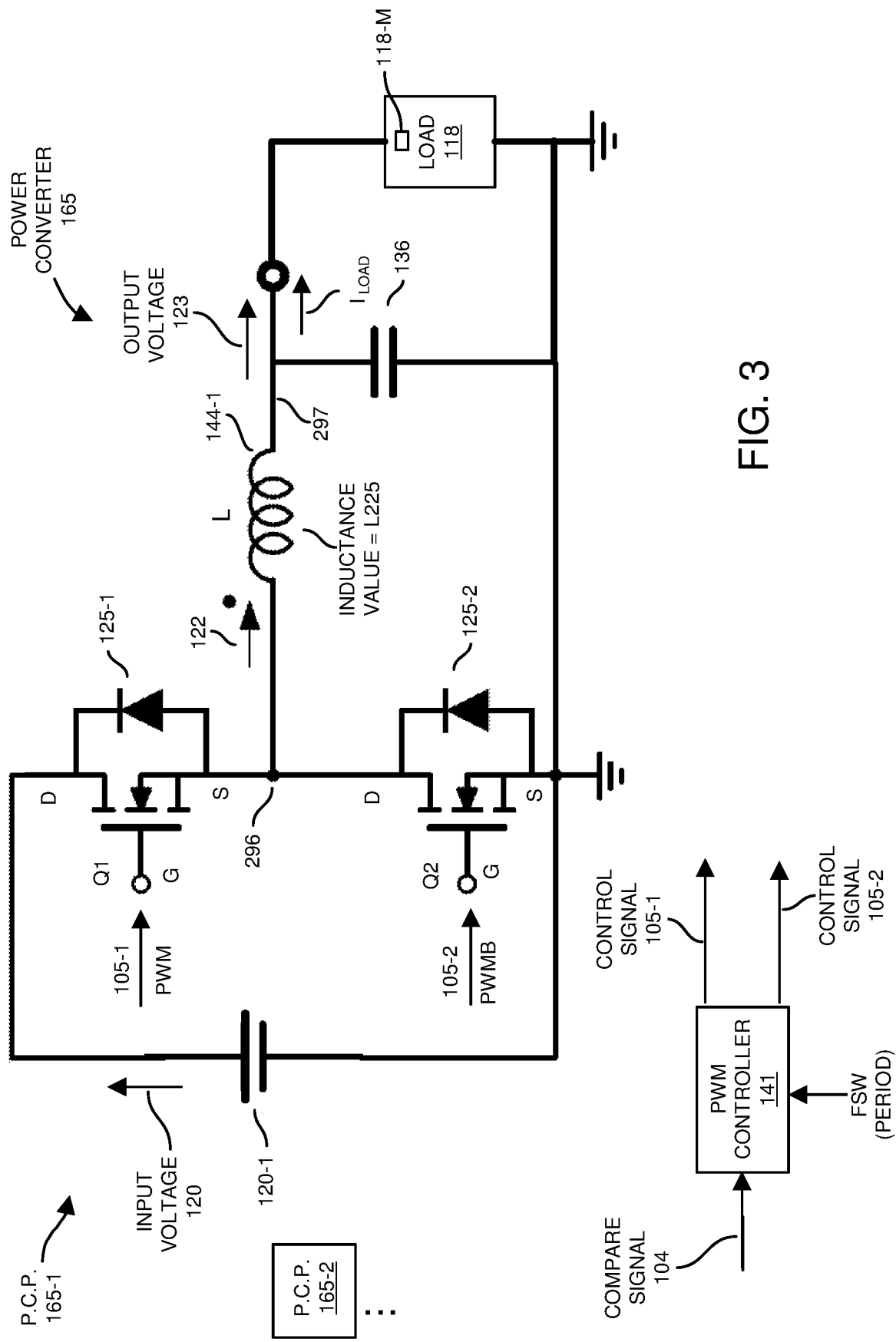
FIG. 3 is a diagram illustrating an example implementation of a power converter including one or more power converter phases according to embodiments herein.

FIG. 3 is an example diagram illustrating operation of a power converter and generation of an output voltage according to embodiments herein.

As previously discussed, the power converter 165 (maser or slave) and corresponding power supply 100 can be configured as any suitable type of power converter or power converter system.

In this non-limiting example embodiment, the power converter phase 165-1 is configured as a buck converter. The power converter 165 includes any number of power converter phases configured in a similar manner.

Power converter phase 165-1 includes voltage source 120-1 (supplying input voltage 120), switch Q1 (high side switch circuitry 125-1), switch Q2 (low side switch circuitry 125-2), inductor 144-1, and output capacitor 136 (such as one or more capacitors).

Switches 125 (Q1, Q2, etc.) can be implemented in any suitable manner. In one embodiment, each of the switches 125 is a so-called field effect transistor. Any suitable type of one or more types of switches can be used to provide switching as discussed herein.

Note that the power supply 100 includes one or more power converters 165 (voltage regulators such as master power converter phase 165-1, slave power converter phase 165-2, etc.) disposed in parallel to produce the output voltage 123. Each voltage converter such as power converter phase 165-2 operates in a similar manner as power converter 165-1.

Each of the power converter phases can be operated in or out of phase with respect to each other.

Note further that although the power converter phases in FIG. 3 are shown as a buck converter configuration, the power converter 165 can be instantiated as any suitable type of voltage converter and include any number of phases, providing regulation of a respective output voltage 123 as described herein.

As further shown in this example embodiment, the switch Q1 (high side switch circuitry 125-1) of power converter phase 165-1 is connected in series with switch Q2 (low side switch circuitry 125-2) between the input voltage source 120-1 and corresponding ground reference.

For example, the drain node (D) of the switch Q1 is connected to the voltage source 220 to receive input voltage 120-1. The pulse width modulation controller 141 drives the gate node (G) of switch Q1 with control signal 105-1 (a.k.a., signal PWM).

The source node (S) of the switch Q1 is connected to the drain node (D) of the switch Q2 at node 296. Recall that, in one embodiment, the node 296 is monitored by the output current monitor 142. The pulse width modulation controller 141 drives the gate node (G) of switch Q2 with control signal 105-2 (a.k.a., signal PWMB). The source node (S) of the switch Q2 is connected to ground.

As previously discussed, the power converter 165-1 further includes inductor 144-1. Inductor 144-1 extends from the node 296 to the output capacitor 136 and dynamic load 118.

Via switching of the switches Q1 and Q2 via respective control signal 105-1 (applied to gate G of switch Q1) and control signal 105-2 (applied to gate G of switch Q2), the node 296 coupling the source (S) node of switch Q1 and the drain (D) node of switch Q2 provides output current from source 120-1 or ground through the inductor 144-1, resulting in generation of the output voltage 123 and corresponding output current 122 or $I_{LOAD}$ powering the load 118 and energizing capacitors 136.

In general, the magnitude of the current $I_{LOAD}$ is equal to a magnitude of the output current through inductor 144-1. Presence of output capacitor 136 reduces a ripple voltage associated with the output voltage 123.

In further example embodiments, as previously discussed, the controller 140 controls switching of the switches Q1 and Q2 (such as in each of the one or more power converter phases) based on one or more feedback parameters as further discussed herein.

In general, the magnitude of the output current 122 through the inductor 144-1 from the power converter phase increases when the high-side switch Q1 (such as one or more field effect transistor or other suitable component) is ON and low-side switch Q2 (such as one or more field effect transistor or other suitable component) is OFF; the magnitude of current 122 through the inductor 144-1 decreases when the high-side switch Q1 is OFF and low side switch circuitry Q2 is ON.

The repetition of turning switches 125 ON and OFF over each of multiple cycles produces an appropriate output voltage 123 and corresponding (average) output current 122 to power the dynamic load 118.

The switching frequency of controlling switches 125 (period of each control cycle) can be fixed or variable as further discussed herein.

Figure 4:
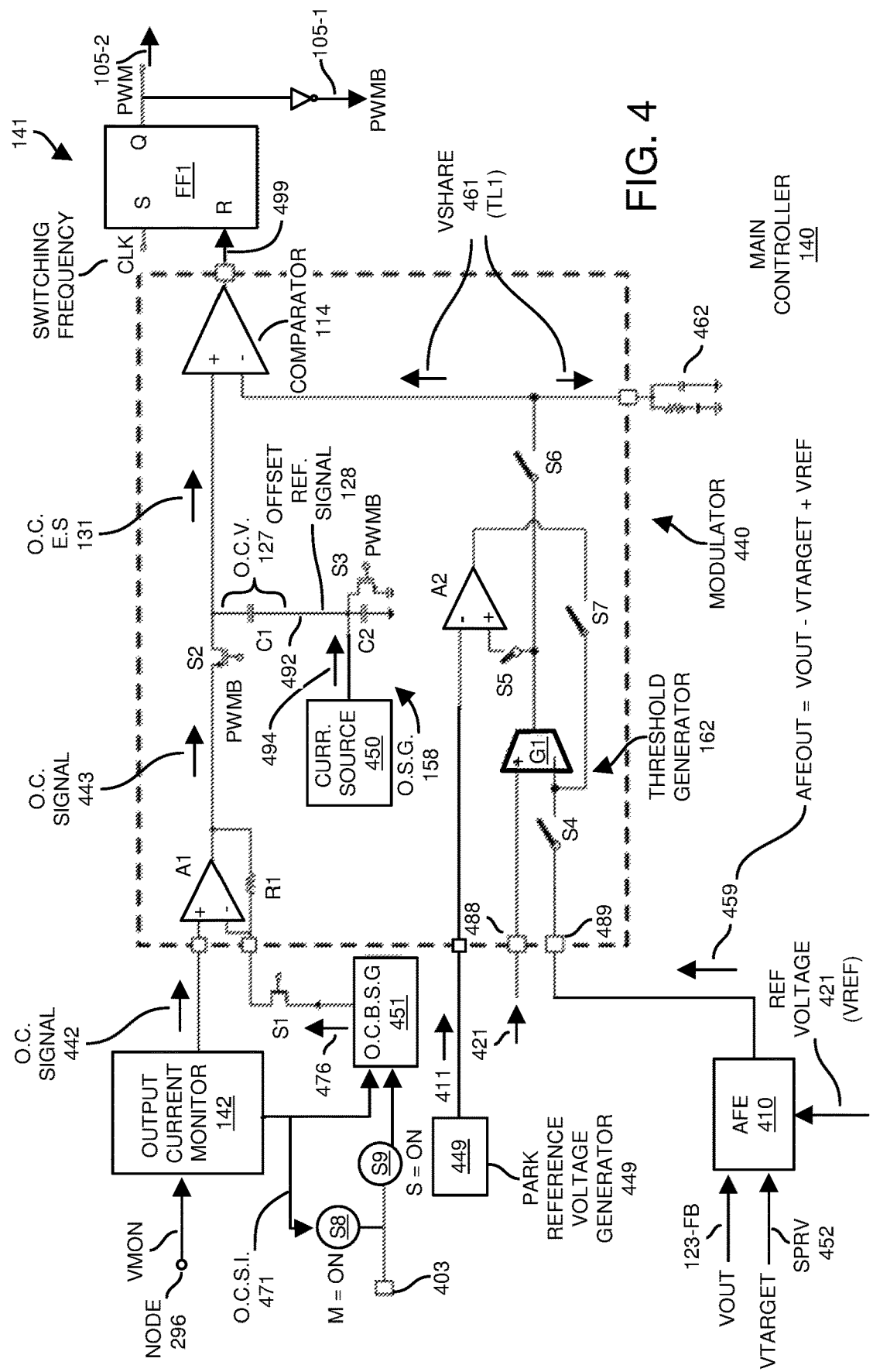
FIG. 4 is an example diagram illustrating components to control conversion of an input voltage into an output voltage according to embodiments herein.

FIG. 4 is an example diagram illustrating components to control conversion of an input voltage into an output voltage according to embodiments herein.

In further example embodiments, the main controller 140 includes output current monitor 142, resistor R1, switch S1, switch S2, switch S3, switch S4, switch S5, switch S6, switch S7, switch S8, switch S9, output current balance signal generator 451 (i.e., compensation signal generator such as voltage to current converter that sinks or sources current to resistor R1), park reference voltage generator 449, amplifier A1, amplifier A2, transconductance amplifier G1, comparator 114, components 462, and flip-flop FF1.

Note that the output current balance signal generator 451 is generally non-functional or not activated for the master power converter phase but is active for each of the slave power converter phase. The slave power converter phase uses the compensation signal 476 to adjust the operation of amplifier A1, adjusting compensation or bias applied to the output current signal 443.

As further shown, the output current monitor 142 monitors voltage VMON of a respective node 296 of a respective power converter phase. The output current monitor 142 outputs the output current signal 442 (such as continuous samples of the output current 122 provided by the corresponding power converter phase) to the non-inverting input (+node) of amplifier A1. The output current monitor 142 also outputs the output current status information 471 (such as an average amount of output current 122 delivered by the corresponding power converter phase to the load 118) to the switch S8 as well as the output current balance signal generator 451.

The switch S8, depending upon its setting, provides connectivity of the output current monitor 142 and the node 403 of the main controller 140. If the main controller 140 is implemented in a respective master power converter phase, the switch S8 is set to the ON (SHORTED) state, resulting in forwarding of the output current information 471 through the node 403 to each of the slave power converter phases.

The output current information 471 provides a basis in which each of the corresponding slave power converter phases controls their respective output current delivered to the load 118. If the main controller 140 is implemented in a respective slave power converter phase, the switch S8 is set to an OFF state (OPEN circuit).

The switch S9, depending upon its setting, provides connectivity of the node 403 to the output current balance signal generator 451 of the main controller 140. If the main controller 140 is implemented in a respective master power converter phase, the switch S9 is set to the OFF state (i.e., open) because the output current status information 471 is transmitted from the node 403 to other slave power converter phases.

As further discussed herein, in one embodiment, the switch S1 of the master power converter phase is set to an OPEN state as well, resulting in the amplifier A1 operating in a buffer mode without any compensation from the compensation signal 476 produced by the output current balance signal generator 451. In other words, the output current signal 443 is generally equal to the output current signal 442 (such as output current 122 samples) for the master power converter phase.

Conversely, if the main controller 140 is implemented in a respective slave power converter phase, the switch S9 is set to an ON state (i.e., SHORT circuit) as previously discussed. In this latter instance, the switch S9 conveys the signal 471 from the master power converter phase to the output current balance signal generator 451 of the slave power converter phase. Additionally, the slave power converter phase produces local output current information 471 provided to the output current balance signal generator 451. As further discussed herein, in the slave power converter phase, the output current balance signal generator 451 uses the output current information 471 from the master power converter phase and the output current information 471 locally generated by the slave power converter phase to adjust the generation of the output current signal 443 based on the output current signal 442.

As further discussed herein, adjustment to the amplifier A1 operation via compensation signal 476 results in desirable balancing or equalizing a magnitude of output current 122 provided by each of the slave power converter phase to the magnitude of output current provided by the master power converter phase.

Additionally, the modulator 440 of FIG. 4 includes switch S2, capacitor C1, capacitor C2, switch S3, and current source 450. In general, as further discussed with respect to the timing shown in FIG. 6, the main controller 140 controls operation of the switches S2 and S3 such that the capacitor C1 (such as a storage component) stores output current value 127 such as a voltage value representing a minimum valley current value for the output current 122. The output current value 127 (such as a measured output current value at an instant in time for a control cycle) provides a basis in which to perform current emulation.

As further shown, the current source 450 produces current 494 to generate a respective ramp voltage (such as offset signal 128) at node 492. In one embodiment, the resulting output current emulation signal 131 therefore is a summation of the output current value 127 and the offset signal 128. Thus, the magnitude of the offset reference value 128 varies over time.

Note that in one embodiment, the main controller 140 varies a slew rate of the offset reference signal 128 (such as a slope of ramp signal) depending on a magnitude of a switching frequency (i.e., signal CLK) of controlling switches 125 in the power converter that convert the input voltage 120 into the output voltage 123. For example, a setting of the magnitude of the current 494 supplied to the capacitor C2 is higher for higher magnitudes of the switching frequency than for lower magnitudes of the switching frequency.

The output current emulation signal 131 is supplied to the non-inverting input node of comparator 114. Comparator 140 compares the magnitude of the output current emulation signal 131 (representative of an actual output current 122 supplied by the respective power converter phase to the load) to the threshold signal TL1 (a.k.a., VSHARE, signal 461).

In response to detecting that the magnitude of the output current emulation signal 131 crosses (such as equal to or exceeds) the threshold signal TL1, the comparator 140 produces a respective signal 499, resulting in resetting the flip-flop FF1 and its corresponding Q output to be reset to a logic low. In such an instance, the control signal 105-1 (a.k.a., PWM signal) is set to a logic low; the control signal 105-2 (PWMB signal) set to a logic high.

In one embodiment, as further discussed herein, the threshold signal VSHARE 461 (TL1) is generated by the threshold generator 162 in the master power converter phase and used by one or more slave power converter phases to control generation of the output voltage 123. For example, the threshold signal controls timing (such as duration of time) in which high side switch circuitry in each of the power converter phases (master or slave) is activated to collectively generate the output voltage 123.

In one embodiment, the main controller 140 includes analog front end 110. In one embodiment, the analog front end 410 (such as circuit) receives the output voltage feedback signal 123-FB (Vout), setpoint reference voltage 452 (Vtarget), and reference voltage 421 (such as VREF=600 millivolts DC).

Based on these received signals, the analog front end 410 produces the respective analog front end signal 459 (AFEOUT). More specifically in one embodiment, the analog front end 410 produces the signal 459 to be equal to VOUT−VTARGET+VREF.

Additionally, the main controller 140 includes park reference voltage generator 449 as well as corresponding threshold generator 162. Details of operation are further discussed below.

In one embodiment, the modulator 440 is a current mode regulator and the modulator 440 is operated in fixed frequency mode. The PWM signal is set at the rising edge of each reference clock cycle. The modulator 440 provides the control signal 499 to reset the flip-flop FF1 and corresponding PWM signal when the comparator 114 detects that the output current emulation signal 131 is greater than or equal to the threshold signal VSHARE 461 (TL1) in a manner as previously discussed. Thus, a magnitude of the output current emulation signal 131 to the threshold signal VSHARE 461 (TL1) controls timing (such as duration of time) in which high side switch circuitry in each of the power converter phases (master or slave) is activated to collectively generate the output voltage 123.

Figure 11:
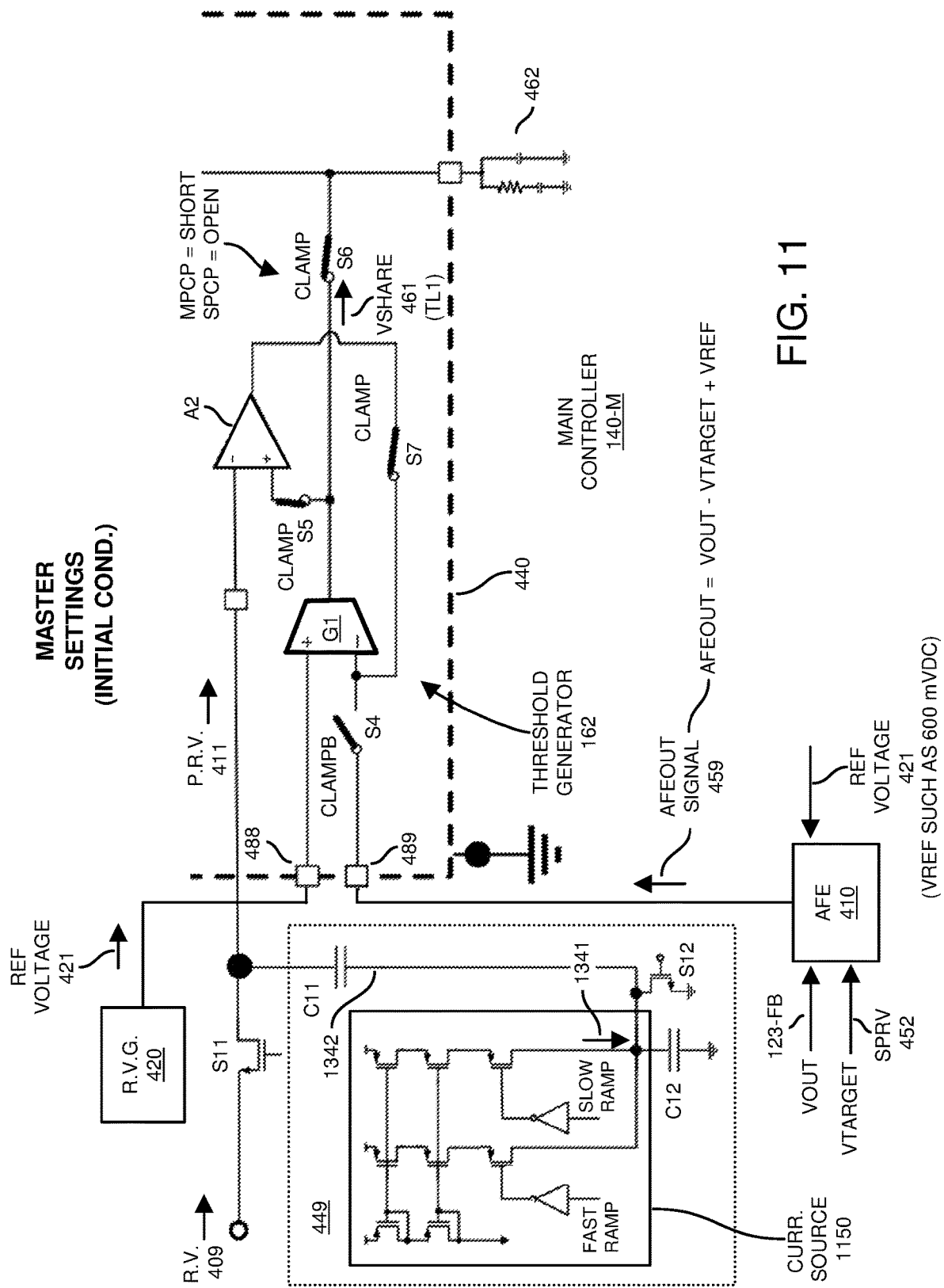
FIG. 11 is an example diagram illustrating implementation of a threshold signal generator and related components according to embodiments herein
Figure 12:
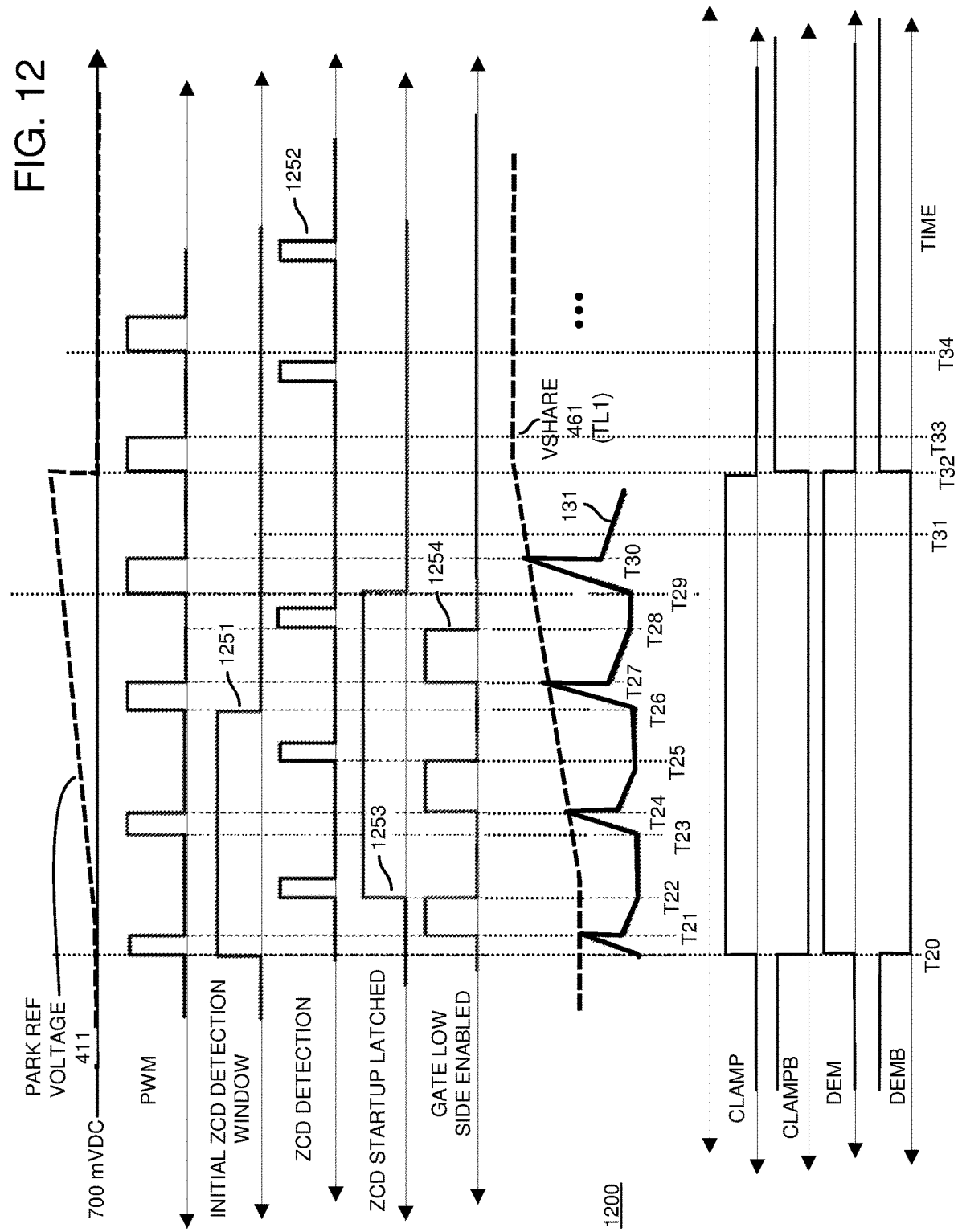
FIG. 12 is an example timing diagram illustrating emulation of an output current based on sampling of an actual output current of a power converter and temporary operation of the power converter in a diode emulation mode according to embodiments herein according to embodiments herein.
Figure 13:
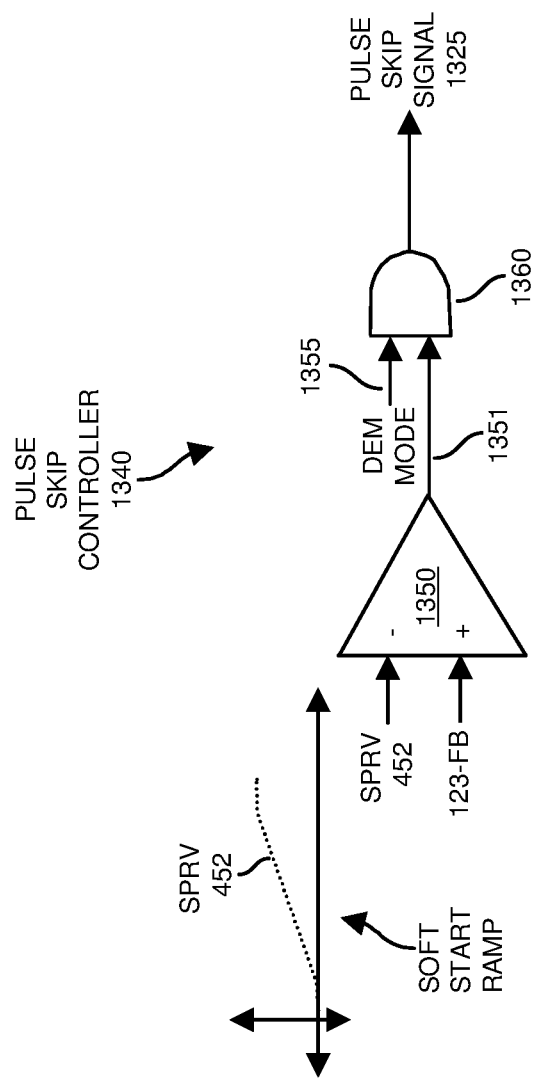
FIG. 13 is an example diagram illustrating a pulse skip control technique according to embodiments herein.

Operation of threshold generator 162 is further discussed in FIGS. 11-13 and may vary depending on a startup or normal mode of operating the power converter phases.

Referring again to FIG. 4, in general, first embodiments include generation of the output current emulation signal 131; the output current monitor 142 (a.k.a., current sensing block) checks (monitors) the current (via voltage VMON) of the syncFET (low side switch circuitry 125-2) during Toff time (PWMB=logic high). In one embodiment, this current information is translated to a voltage signal and level shifted to 700 mVDC. The Amplifier A1 buffers this signal 442 inputted to modulator 440. The amplifier A2 generates the output current emulation signal 131 based on the offset reference signal 128 and the output current value 127. For example, in one embodiment, the summation of the offset signal 128 and the output current value 127 represents the output current emulation signal 131. As discussed herein, the output current emulation signal 131 is compared to the VSHARE 461 (TL1) via comparator 114 in order to define the width of a respective PWM pulse for each control cycle.

Second embodiments include generation of the VSHARE signal. For example, in one embodiment, an Analog-Front-End amplifier 410 provides the sensed output voltage to the modulator 440. For example, the analog front end amplifier 410 receives output voltage Vout (signal 123-FB), the target (setpoint reference voltage 452), and reference voltage 421. By comparing the output voltage feedback signal 123-FB (VOUT such as output voltage 123 or proportional value) and the internal reference voltage 421 generated by the reference voltage generator 420 to the target voltage (setpoint reference voltage 452, the error signal (namely VSHARE) is provided to the transconductance amplifier Gm1. In general, the differential voltage across the node 488 and 489 is basically the error voltage Vout−Vtarget. In one embodiment, as previously discussed, the threshold level VSHARE 461 (TL1) is also communicated to an off-chip compensation network such as components 462. The main controller 140 controls operation of the respective power converter phase such that the error voltage across node 488 and node 489 is zero or approaching zero as best possible. In general, as previously discussed, the threshold signal VSHARE 461 (TL1) is used as a reference level for a respective comparator 114 in each of the power converter phases to determine the falling edge of the PWM signal to turn off respective high side switch circuitry and turn on respective low side switch circuitry.

In third embodiments, the multiple phases of the power converter 165 are stacked (see FIG. 2) in a manner as previously discussed. In one embodiment, the output current monitor 142 produces respective output current information 471 indicating an average or filtered magnitude of the output current 122 supplied by the master power converter phase to the load 118. The master power converter phase communicates the master phase current information (such as output current information 471) to each of the slave power converter phases. Each of the slave power converter phases uses the received master output current information as a reference value in which to control, such as in a respective feedback loop, a magnitude of the output current 122 supplied by the respective slave power converter phase to the load 118. In such an instance, each of the slave power converter phases controls its respective output current such that it is substantially equal to (such as within 10% of point or other suitable value) of a magnitude of the output current 122 supplied by the master power converter phase to the load.

Detailed operation of the main controller 140 and corresponding components is further discussed in the following FIGS.

Figure 5:
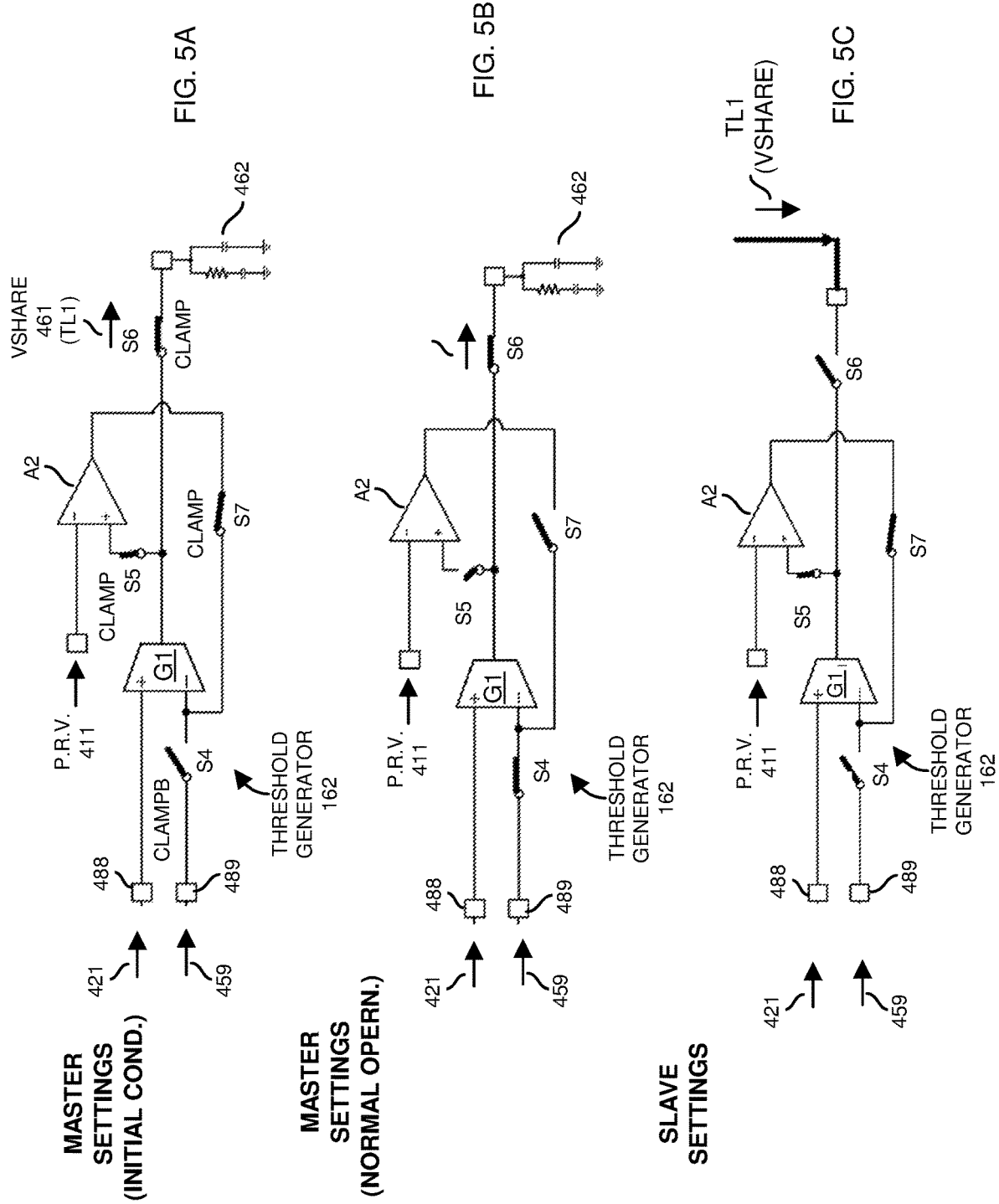
FIGS. 5A, 5B, and 5C are example embodiments of operating a threshold signal generator in different modes according to embodiments herein.

FIG. 5A is an example diagram illustrating switch settings associated with the threshold signal generator according to embodiments herein.

In this embodiment of FIG. 5A, the main controller 140 operates in an open loop mode of generating the output voltage 123 based on the input voltage 122.

For example, during startup, the main controller 140 controls the operation of the threshold generator 162 of the master power converter phase. In such an instance, during this startup mode, the main controller 140 controls switch S4 to an OPEN state (i.e., OFF or deactivated); the main controller 140 controls switch S5 to a CLOSED state (i.e., ON, SHORT, or activated); the main controller 140 controls switch S6 to a CLOSED state (i.e., ON, SHORT, or activated); the main controller 140 controls switch S7 to a CLOSED state (i.e., ON, SHORT, or activated). In such an instance, the amplifier A2 of the threshold generator 162 operates in a buffer mode to produce the threshold signal VSHARE 461 (TL1) (a.k.a. threshold level, threshold value, threshold setting, etc.) to be equal to the park reference voltage 411 (so-called parking reference voltage such as 700 mVDC or other suitable value). Additional details of this mode are discussed in FIGS. 11-13.

FIG. 5B is an example diagram illustrating switch settings associated with the level generator according to embodiments herein.

In this embodiment, the main controller 140 controls the threshold generator 162 of the master power converter phase during normal conditions (after startup and in regulation mode) of operating the power converter 165.

For example, the main controller 140 controls switch S4 to a CLOSED state (i.e., ON, SHORT, or activated); the main controller 140 controls switch S5 to an OPEN state (i.e., OFF or deactivated); the main controller 140 controls switch S6 to a CLOSED state (i.e., ON, SHORT, or activated); the main controller 140 controls switch S7 to an OPEN state (i.e., OFF or deactivated). In such an instance, the transconductance amplifier G1 of the threshold generator 162 produces the threshold signal VSHARE 461 (TL1) based on a difference between the output voltage feedback signal 123-FB (such as the output voltage 123 or a signal that varies proportionally to the output voltage 123) and the setpoint reference voltage 451. More specifically, via the transconductance amplifier G1, the threshold generator 162 sinks and sources current based on a difference between the output voltage feedback signal 123-FB (such as output voltage 123) and setpoint reference voltage 451. This provides regulation of converting the input voltage 120 into the output voltage 123.

FIG. 5C is an example diagram illustrating switch settings associated with the level generator according to embodiments herein.

In this embodiment, the main controller 140 controls settings of the threshold generator 162 for a respective slave power converter phase.

For example, the main controller 140 of the slave power converter phase controls switch S4 of the threshold generator 162 in the slave power converter phase to an OPEN state (i.e., OFF or deactivated); the main controller 140 controls switch S5 to a CLOSED state (i.e., ON, SHORT, or activated); the main controller 140 controls switch S6 to an OPEN state (i.e., OFF or deactivated); the main controller 140 controls switch S7 to a CLOSED state (i.e., ON, SHORT, or activated).

Because the switch S6 is open, the slave power converter phase receives the threshold signal VSHARE 461 (TL1) from the master power converter phase. Thus, as previously discussed each of the power converter phases in the power converter 165 uses the same threshold signal TL1 (a.k.a., VSHARE signal) to provide phase control.

Figure 6:
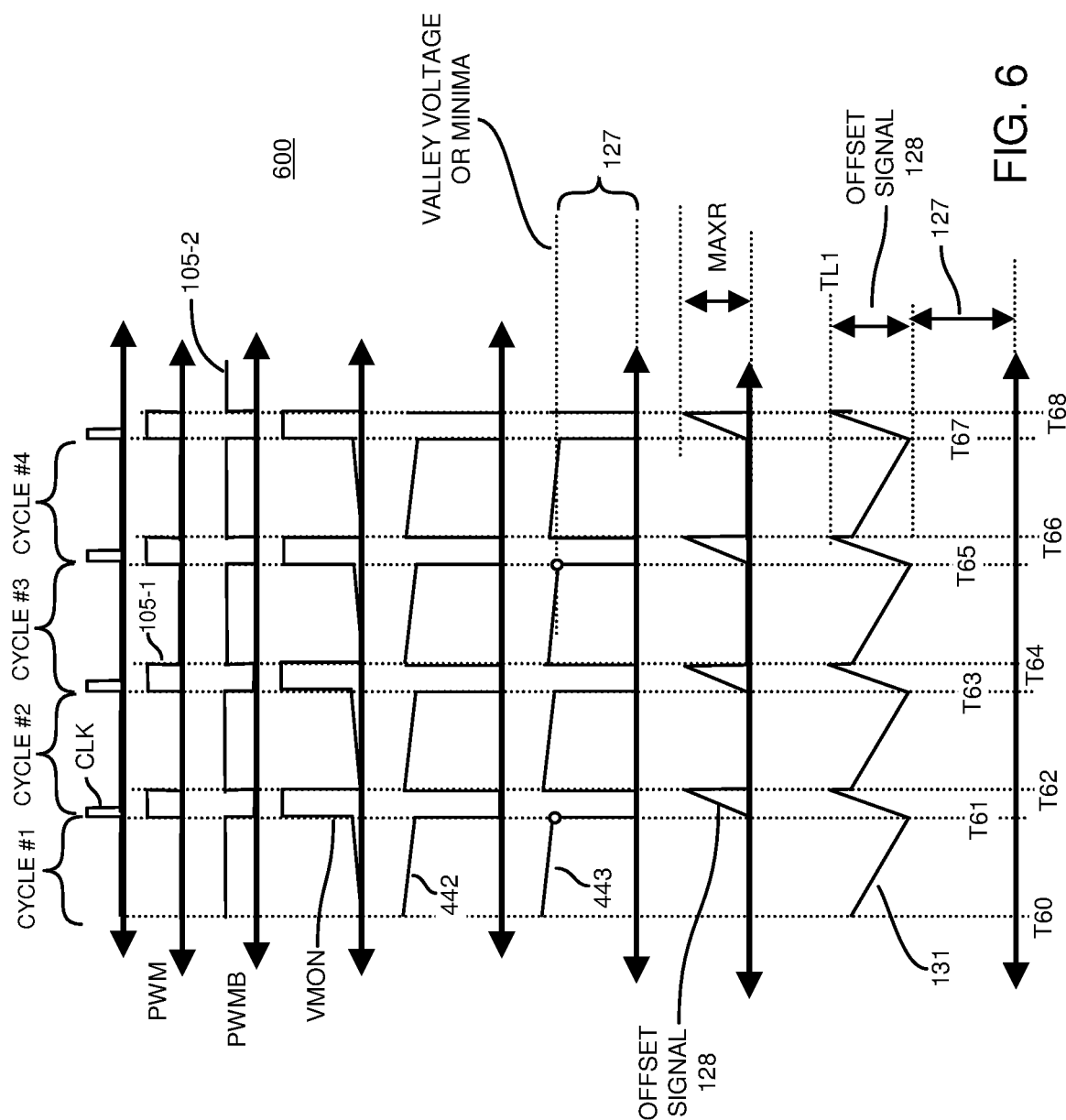
FIG. 6 is an example timing diagram illustrating emulation of an output current and operation of the power converter according to embodiments herein according to embodiments herein.

FIG. 6 is an example timing diagram illustrating emulation of an output current associated with the power converter based on sampling of an actual output current of the power converter according to embodiments herein according to embodiments herein.

In this example embodiment, the main controller 140 controls the operation of the switches 125 in the power converter phase during normal regulation mode to convert the input voltage 120 into the output voltage 123.

For example, between time T60 and T61 (end of control cycle #1), the pulse width modulation generator 141 generates the PWM signal from the Q output of flip-flop FF1 to be a logic low, turning OFF high side switch circuitry 125-1 (to an OPEN state); this also causes the PWMB signal between time T60 and T61 to be a logic high turning ON low side switch circuitry (to a SHORTED state). During such time, the voltage on node 296 (see FIG. 2) such as connecting high side switch circuitry and low side switch circuitry as monitored by the current monitor 142 is VMON. Based on the monitored voltage VMON, the current monitor 142 produces the output current signal 442 tracking a magnitude of the output current 122 between T60 and T62. Assuming that the power converter phase is a master phase, switch S1 is open, and amplifier A1 operates in a buffer mode to produce the output current signal 443, which tracks a magnitude of the output current 122 between time T60 and T61.

On the other hand, assuming that the power converter phase is a slave power converter phase, switch S1 is closed (shorted), and amplifier A1 operates in a buffer mode to produce the output current signal 443, which generally tracks a magnitude of the output current 122 between time T60 and T61. However, as further discussed later in this application, the output current balance signal generator 451 (i.e., compensation logic or circuitry) produces compensation signal 476 supplied to the inverting input of the amplifier A1. This causes an adjustment (compensation) to the output current signal 443. The magnitude of the compensation signal 476 varies over time such that each of the power converter phases provides an equal amount of output current to the dynamic load 118. See below for more details.

Referring again to the power converter phase as being a master or slave power converter phase, note that switch S2 is set to an ON state between time T60 and T61. Switch S3 is also set to an ON state between time T60 and T61, discharging the capacitor C2.

In this example embodiment, in a manner as previously discussed, the capacitor C1 (storage component) stores a sample of the output current signal 443 (such as a valley voltage indicative of minima current value) as a differential voltage across nodes of the capacitor C2. In one embodiment, the output current value 127 stored in the capacitor C1 (i.e., storage component C1) represents a measured valley magnitude of the output current 122 at an instant in time T61 (see also instants in time T63, T65, T67, etc.). In one embodiment, the instant in time T61 occurs at a transition between i) deactivating synchronous switch circuitry (such as low side switch circuitry 125-2) of the power converter, and ii) activating control switch circuitry (such as high side switch circuitry 125-1) in the power converter to convert an input voltage into the output voltage.

The output current emulation signal 131 tracks (such as is equal to) signal 443 between time T60 and T61. At the end of the switching cycle #1 at time T61, the CLK signal (inputted to the S input of the flip flop FF1) goes logic high, setting the PWM signal of the pulse width modulation generator 141 to a logic high state at time T61 also resetting the PWMB signal of the pulse width modulation generator 141 to a logic low at time T61.

Between time T61 and T62, the pulse width modulation generator 141 generates the PWM signal from its Q output to be a logic high, turning ON high side switch circuitry 125-1 (to a SHORTED state), and PWMB signal to be a logic low, turning OFF low side switch circuitry (to an OPEN state).

Further in this example embodiment, main controller 140 controls the switch S2 to an OFF state between time T61 and T62. Via main controller 140, switch S3 is set to an OFF state as well between time T60 and T61. Further, between time T61 and T62, the current source 450 of the offset reference generator 158 drives the capacitor C2 with a constant current 494, charging the capacitor C2 (such as producing a monotonic ramp signal). The offset signal 128 (stored in capacitor C2, resulting in ramp voltage between time T61 and T62) on the capacitor C2 ramps between zero volts and a MAXR value. This causes the output current value 127 (such as sample voltage value representing a minimum or valley voltage) stored in the main capacitor C1 to be offset with respect to ground via the offset reference signal 128 between time T61 and T62. For example, the output current emulation signal 131 is a summation of the output current value 127 and the offset signal 128.

After time T61, while the PWM signal is logic high and corresponding high side switch circuitry is shorted, the comparator 114 of the modulator 440 compares the output current emulation signal 131 to the threshold signal VSHARE 461 (TL1) generated by the threshold generator 162. In response to detecting that the magnitude of the output current emulation signal 131 crosses (such as is equal to or greater than) a magnitude of threshold signal VSHARE signal 461 (TL), the output signal 499 of the comparator 114 resets the flip flop FF1, causing the PWM signal to be reset to a logic low level and the PWMB signal to be set to a logic high level at time T62. Thus, the magnitude of the threshold signal VSHARE 461 (TL1) controls timing (such as duration of time) in which high side switch circuitry in each of the power converter phases (master or slave) is activated to collectively generate the output voltage 123. More specifically, when the threshold signal VSHARE 461 (TL1) is a lower magnitude, the controller turns OFF the high side switch circuitry earlier in time, shortening a so-called ON-time of the power converter phase; conversely, when the threshold signal VSHARE 461 (TL1) is a higher magnitude, the controller turns OFF the high side switch circuitry later in time, increasing the so-called ON-time of the power converter phase.

More specifically, at time T62, the pulse width modulation generator 141 generates the PWM signal from the Q output of flip flop FF1 to be a logic low turning OFF high side switch circuitry 125-1 (to an OPEN state) and PWMB signal to be a logic high turning ON low side switch circuitry (to a SHORTED state). As previously discussed, the voltage on node 296 (see FIG. 2) such as connecting high side switch circuitry and low side switch circuitry as monitored by the current monitor 142 is VMON. Based on the monitored voltage VMON, the current monitor 142 produces the signal 442 tracking a magnitude of the output current 122. Assuming that the power converter phase is a master phase, switch S1 is open, and amplifier A1 operates in a buffer mode to produce the output current signal 443, which tracks a magnitude of the output current 122 between time T62 and T63.

Assuming that the power converter phase is a slave power converter phase, switch S1 is closed (shorted), the amplifier A1 operates in a buffer mode with inputted compensation signal 476 to produce the output current signal 443, which generally tracks a magnitude of the output current 122 between time T62 and T63. However, as further discussed later in this application, the output current balance signal generator 451 produces compensation signal 476 supplied to the inverting input of the amplifier A1. This causes an adjustment to the output current signal 443. As further discussed later in this specification, the magnitude of the compensation signal 476 varies over time such that each of the power converter phases provides an equal amount of output current to the dynamic load 118.

Referring again to the power converter phase as being a master power converter phase, note that switch S2 is set to an ON state between time T62 and T63, storing a new value of the output current value 127 in the capacitor C1. Switch S3 is also set to an ON state between time T62 and T63, discharging the capacitor C2. In such an instance, the capacitor C1 (storage component) stores another sample of the output current for cycle #2 as output current signal 127 (valley voltage indicative of minima current value) as a differential voltage across nodes of the capacitor C1. Output current emulation signal 131 tracks (such as is equal to) signal 443 between time T62 and T63. At the end of the switching cycle #2, the CLK signal (inputted to the S input of the flip flop FF1) goes logic high, setting the PWM signal of the pulse width modulation generator 141 to a logic high between T63 and T64 and resetting the PWMB signal of the pulse width modulation generator 141 to a logic low between times T61 and T62.

This process repeats each control cycle.

Note again that embodiments herein can be implemented via analog or digital circuitry. For example, any of the input signals as discussed herein can be converted to digital signals, and then digitally processed to produce respective output signals that are converted back to analog voltages.

Figure 7:
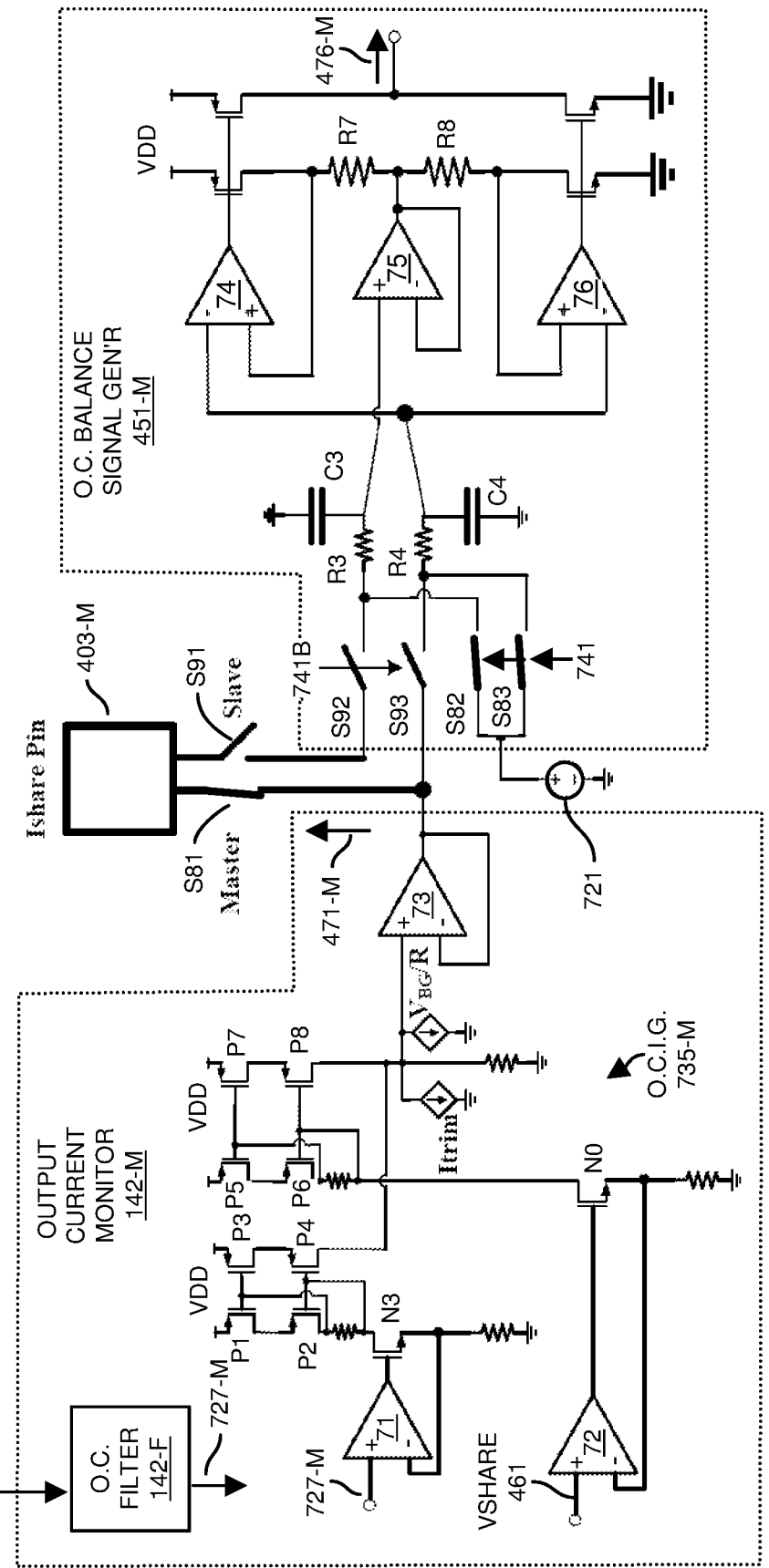
FIG. 7 is an example diagram illustrating implementation of a current sharing circuit in a master power converter according to embodiments herein.

FIG. 7 is an example diagram illustrating implementation of a current sharing circuit in a master power converter according to embodiments herein.

In this example embodiment, the master power converter phase 165-1 includes main controller 140-M including output current monitor 142-M and output current balance signal generator 451-M (a.k.a., compensation signal generator) as shown in FIG. 7.

The output current monitor 142-M includes an output current information generator 735-M such as including amplifier 71, amplifier 72, amplifier 73, multiple transistors P1, P2, P3, P4, P5, P6, P7, P8, current source ITRIM, reference voltage source 721, and current source Vbg/R.

Output current monitor 142-M includes output current filter 142-F to produce the signal 727-M indicating status information such as an average amount of output current supplied by the master power converter phase 165-1 to the dynamic load 118.

The main controller 140-M of the master power converter phase 165-1 further includes switch S81, switch S91, and input-output pin 403-M. The input-output pin 403-M is an output pin for the master power converter phase 165-1. For example, switch S81 is set to a shorted state (on state, activated state, etc.); The switch S91 is set to an open state (OFF state). In such an instance, the master power converter phase 165-1 and corresponding output current monitor 142-M outputs the output current status information 471 generated by the output current monitor 142-M through the switch S81 and node 403-M to each of the other slave power converter phases. Each of the slave power converter phases uses the received output current status information 471-M (produced by the master power converter phase) as a basis in which to regulate a magnitude of respective output current for that slave power converter phase such that each of the master power converter phase and the one or more slave power converter phases provides a substantially equal amount of output current to the respective load 118.

Thus, in this example embodiment, the output current monitor 142-M monitors a magnitude of output current supplied by the master power converter phase 165-1 to the load 118. Based on VMON or other signal indicating a magnitude of the output current associated with the master power converter phase, the output current filter 142-F generates the signal 727-M indicative of the average magnitude of the output current supplied by the master power converter phase 165-1 to the dynamic load 118.

The output current information generator 735-M thus receives the signal 727-M and the VSHARE signal 461 (threshold signal TL1) and uses such information to produce the respective output current information 471.

More specifically, in one embodiment, the configuration of the components in output current information generator 735-M produces the output current status information 471-M as a function of: i) signal 727-M, ii) threshold signal VSHARE 461 (TL1), and iii) signal Vbg (reference signal). In one embodiment, the output current status information 471 equals a summation of signal 727-M and VSHARE signal 461 minus the signal Vbg.

As previously discussed, because the switch S81 is set to a shorted state for the master power converter phase, the output current monitor 142-M communicates the output current status information 471 to the other slave power converter phases.

Note further that the main controller 140-M also includes output current balance signal generator 451-M, which is generally deactivated for the master power converter phase 165-1. For example, as shown, the output current balance signal generator 451-M includes switches S82, S83, S92, S93, resistor R3, resistor R4, capacitor C3, capacitor C4, amplifier 74, amplifier 75, and amplifier 76.

The main controller 140-M generates control signal 741 to activate both of switches S82 and S83 to a shorted or closed state. The main controller 140-M generates control signal 741B (inverted signal of signal 747) to deactivate both of switches S92 and S93 to an OPEN or OFF state.

Activation of the switches S82 and S83 to the ON state inputs the same reference voltage from voltage source 721 (reference voltage) to the resistors R3 and R4 and corresponding circuit paths of the output current balance signal generator 451-M. This results in the compensation signal 476-M being zero because there is no difference between the reference voltage inputted to the resistor R3 and the reference voltage inputted to the resistor R4. In such an instance, the output current balance signal generator 451 does not provide compensation to the inverting input of amplifier A1 in FIG. 4. Also, note also that the switch S1 in FIG. 4 set to an open state for the master power converter phase 165-1.

Figure 8:
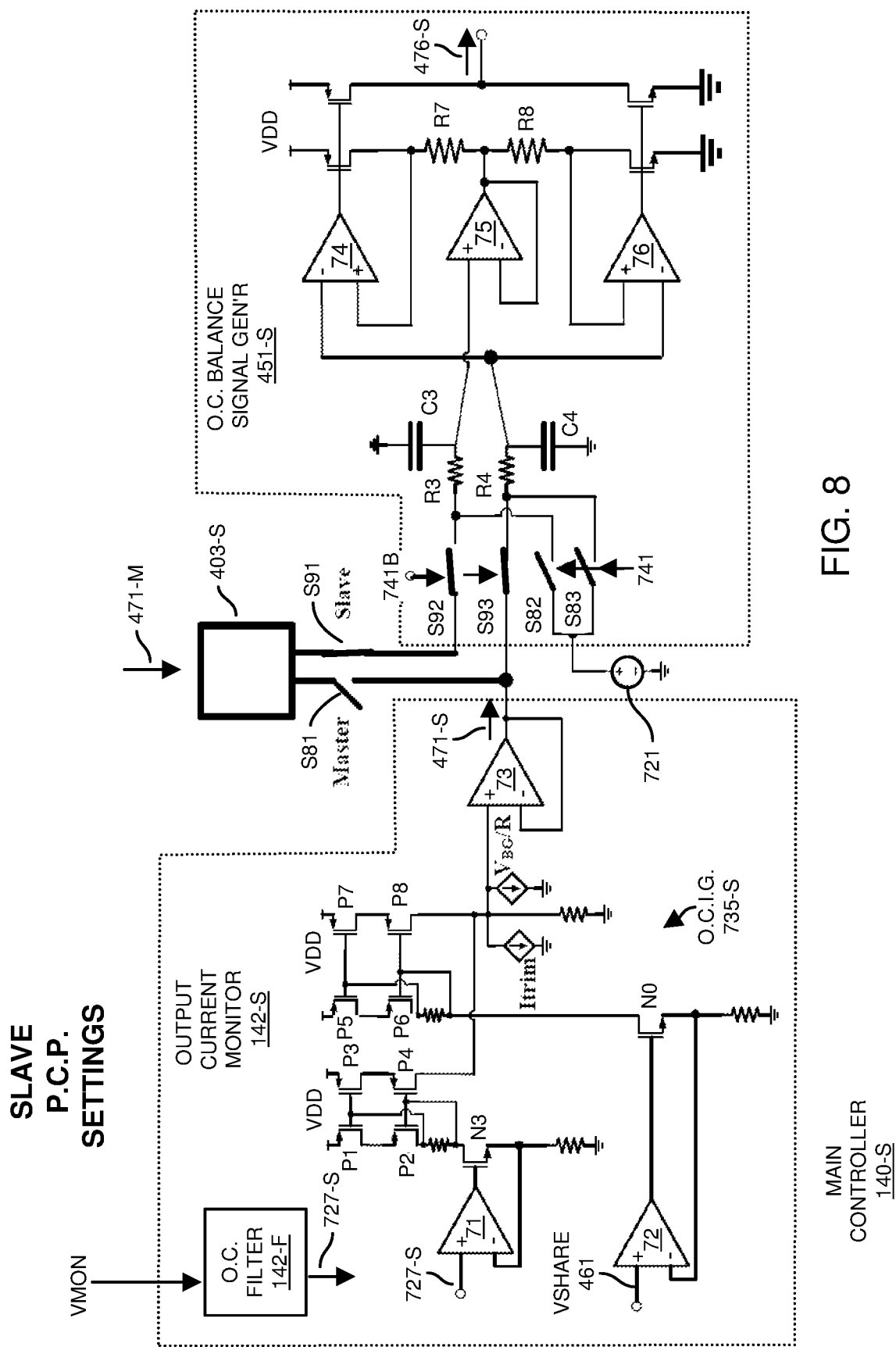
FIG. 8 is an example diagram illustrating implementation of a current sharing circuit in a slave power converter according to embodiments herein.

FIG. 8 is an example diagram illustrating implementation of a current sharing circuit in a slave power converter according to embodiments herein.

In this example embodiment, each of the slave power converter phases 165-2, 165-3, etc., includes main controller 140-S including output current monitor 142-S and output current balance signal generator 451-S (a.k.a., compensation signal generator) as shown in FIG. 8.

The output current monitor 142-S includes an output current information generator 735-S such as including amplifier 71, amplifier 72, amplifier 73, multiple transistors P1, P2, P3, P4, P5, P6, P7, P8, current source ITRIM, reference voltage source 721, and current source Vbg/R.

Output current monitor 142-S includes output current filter 142-F to produce the signal 727-S indicating status information such as an average amount of output current supplied by the respective slave power converter phase to the dynamic load 118.

The slave main controller 140-S of the slave power converter phase 165-1 further includes switch S81, switch S91, and input-output pin 403-S of a respective modulator 440 (such as a semiconductor chip). The input-output pin 403-S is an input pin for each of the slave power converter phases.

For example, switch S81 is set to an OPEN state (OFF state, deactivated state, etc.); the switch S91 is set to a SHORTED state (ON state). In such an instance, the slave power converter phase and corresponding output current monitor 142-S outputs the output current status information 471-S generated by the output current monitor 142-S through the switch S93 to resistor R4 and corresponding circuit path of the output current balance signal generator 451-S. Additionally, the resistor R3 and corresponding circuit path of the output current balance signal generator 451-S receives the output current information 471-M through the switch S91 from the input pin 403-S.

As previously discussed, each of the slave power converter phases uses the received output current status information 471-M (produced by the master power converter phase) as a basis in which to regulate a magnitude of respective output current for that slave power converter phase such that each of the slave power converter phase and the one or more slave power converter phases provides a substantially equal amount of output current to the respective load 118.

Thus, in this example embodiment, the output current monitor 142-S monitors a magnitude of output current supplied by the slave power converter phase to the load 118. Based on VMON or other signal indicating a magnitude of the output current associated with the slave power converter phase, the output current filter 142-F generates the signal 727-S indicative of the average magnitude of the output current supplied by the slave power converter phase to the dynamic load 118.

The output current information generator 735-S thus receives the signal 727-S and the VSHARE signal 461 (threshold signal TL1) and uses such information to produce the respective output current information 471-S.

More specifically, in one embodiment, the configuration of the components in output current information generator 735-S produces the output current status information 471-S as a function of: i) signal 727-S, ii) VSHARE signal 461 (TL1), and iii) signal Vbg (reference signal). In one embodiment, the output current status information 471 equals a summation of signal 727-S and VSHARE signal 461 minus the signal Vbg.

As previously discussed, because the switch S81 is OPEN, the output current monitor 142-S does not communicate the output current status information 471-S to the other slave power converter phases.

The main controller 140-S also includes output current balance signal generator 451-S, which is activated for the slave power converter phase. For example, as shown, the output current balance signal generator 451-S includes switches S82, S83, S92, S93, resistor R3, resistor R4, capacitor C3, capacitor C4, amplifier 74, amplifier 75, and amplifier 76. The main controller 140-5 generates control signal 741 to activate both of switches S92 and S93 to a shorted or closed state. The main controller 140-S generates control signal 741B (inverted signal of signal 747) to deactivate both of switches S82 and S83 to an OPEN or OFF state.

This results in the compensation signal 476-S being based on a difference between the output current information 471-M and the output current information 471-S.

For example, if the magnitude of the current supplied by the master power converter phases (such as magnitude M1 at time T1) is greater than the magnitude of the output current supplied by the slave power converter phase (such as magnitude S1 at time T1), the output current balance signal generator 451-S produces the compensation signal 476-S to be proportional to the difference of M1 and S1. In this example, because M1 is greater than S1, the compensation signal 476-S applies a positive bias to the output current signal 442 to produce the output current signal 443 via amplifier A1 (see FIG. 4). This has the effect of increasing a duration in which respective high side switch circuitry in the slave power converter phase is activated, resulting in an increase in the amount of output current supplied by the slave power converter phase to the load.

Conversely, if the magnitude of the current supplied by the master power converter phases (such as magnitude M2 at time T2) is less than the magnitude of the output current supplied by the slave power converter phase (such as magnitude S2 at time T2), the output current balance signal generator 451-S produces the compensation signal 476-S to be proportional to the difference of M2 and S2. In this example, because M2 is less than S2, the compensation signal 476-S applies a negative bias (proportional to the difference of M2 and S2) to the output current signal 442 to produce the output current signal 443 via amplifier A1 (see FIG. 4). This has the effect of decreasing a duration in which respective high side switch circuitry in the slave power converter phase is activated, resulting in lowering an amount of output current supplied by the slave power converter phase to the load.

Accordingly, via compensation provided by the compensation signal 476-S for each slave power converter phase, embodiments herein include regulation of the respective output current from each of the slave power converter phases such that the magnitude of the output current from each of the power converter phases is substantially equal.

Thus, the output current balance signal generator 451-S associated with the slave power converter phase does provide compensation to the inverting input of amplifier A1 in FIG. 4. Note also that the switch S1 in FIG. 4 set to a SHORTED state for the slave power converter phase.

Note further that the compensation provided by the compensation signal 476-S can be implemented in any suitable manner. For example, as previously discussed, the compensation signal modifies the respective magnitude of the output current signal 443 supplied by the amplifier A1 to produce the output current value 127 stored in the capacitor C1 for each of the power converter phases. In further example embodiments, the compensation can be applied to the respective received threshold signal TL1 to achieve the same type of regulation. However, in this latter instance, each of the slave power converter phases would generate an appropriately adjusted threshold signal based upon the threshold signal TL1 (VSHARE 461) received from the master power converter phase.

Note further that generation of the output current information 471-M by the main controller 140-M and output current information 471-S by the slave power converter phase enable cancelation of errors. For example, the ground associated with the main controller 140-M and corresponding master power converter phase may be different than a ground associated with the main controller 140-S and corresponding slave power converter phase. In one embodiment, the output current balance signal generator 451-S reduces the error associated with the possible ground differences. For example, in one embodiment, the output current information 471-S equals:

Slave–OUTPUT CURRENT+VSHARE–$V_{bg}$, where the Slave–OUTPUT CURRENT=a magnitude of average output current signal 727-S.

The output current status information 471-M equals:

Master–OUTPUT CURRENT+VSHARE–$V_{bg}$, where the Master–OUTPUT CURRENT=a magnitude of average output current signal 727-M.

The output current balance signal generator 451-S produces the compensation signal 476-S based on a magnitude of a difference between the output current information 471-M and output current information 471-S, which equals:

Master–OUTPUT CURRENT–Slave–OUTPUT CURRENT.

Thus, the implementation of a common mode (VSHARE) shared by each of the power converter phases and difference function associated with the output current balance signal generator 451-S enables cancelation of ground errors between the power converter phases. Otherwise, the ground errors may cause imbalance of the output currents. For example, the power converter phase 165-1 is referenced to a first ground signal. The second power converter phase 165-2 is referenced to a second ground signal different than the first ground signal. The implementation of current adjustment control as discussed herein is beneficial because it cancels ground errors since the VSHARE signal to which the average current signals (727-S and 727-M) are referenced is common to all of the power converter phases.

Thus, according to embodiments herein, the first power converter phase 165-1 and corresponding controller 140-M communicates the threshold signal VSHARE 461 and first output current status information 471-M to a second controller 140-S (associated with a second power converter phase). The second controller 140-S controls operation of the second power converter phase 165-2.

In one embodiment, the first output current status information 471-M indicates an average magnitude of the output current supplied by the first power converter phase 165-M to the load 118. In one embodiment, the first controller 140-M produces the first output current status information 471-M as a function of the threshold signal VSHARE 461. For example, in one embodiment, as previously discussed, the first output current status information 471-M is based on a summation of the threshold signal VSHARE 461 and a first signal 727-M indicating the average magnitude of the output current supplied by the first power converter phase 165-1 to the load 118.

The second controller 140-S produces second output current status information 471-S based on the threshold signal VSHARE 461 and a second signal 727-S; the second signal 727-S indicates an average magnitude of output current supplied by the second power converter phase 165-2 to the load 118. To equalize the output current supplied by the second power converter phase 165-2 to the output current supplied by the first power converter phase 165-1, the second controller controls the average magnitude of output current 727-S supplied by the second power converter phase 165-2 as a function of the first output current status information 471-M and the second output current status information 471-S. In one embodiment, the second controller 140-S controls operation of the second power converter phase 165-2 (such as via signal 476-S) based at least in part on a difference between the first signal 727-M and the second signal 727-S. In one embodiment, the difference provides compensation (such as via signal 476-S) to the second power converter phase 165-2 and corresponding control of switches 125 to equalize the output currents of the first power converter phase 165-1 and the second power converter phase 165-2.

Figure 9:
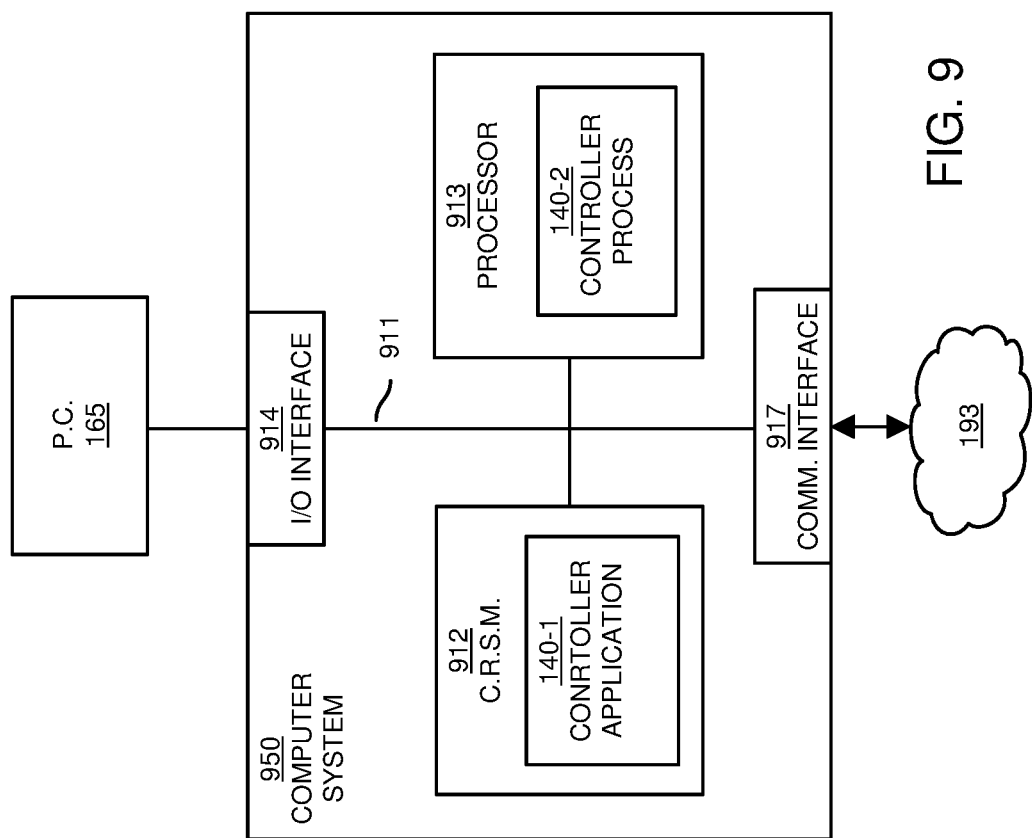
FIG. 9 is an example diagram illustrating computer architecture operable to execute one or more methods according to embodiments herein.

FIG. 9 is an example diagram illustrating example computer architecture operable to execute one or more methods according to embodiments herein.

As previously discussed, any of the resources (such as controller 140, etc.) as discussed herein can be configured to include computer processor hardware and/or corresponding executable instructions to carry out the different operations as discussed herein.

As shown, computer system 900 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to external hardware 999 such as a keyboard, display screen, repository, etc.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with control application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in control application 140-1 stored on computer readable storage medium 912. Execution of the control application 140-1 produces control process 140-2 to carry out any of the operations and/or processes as discussed herein.

Those skilled in the art will understand that the computer system 900 can include other processes and/or software and hardware components, such as an operating system that controls allocation and use of hardware resources to execute control application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 900 may reside at any location or can be included in any suitable resource in any network environment to implement functionality as discussed herein.

Figure 10:
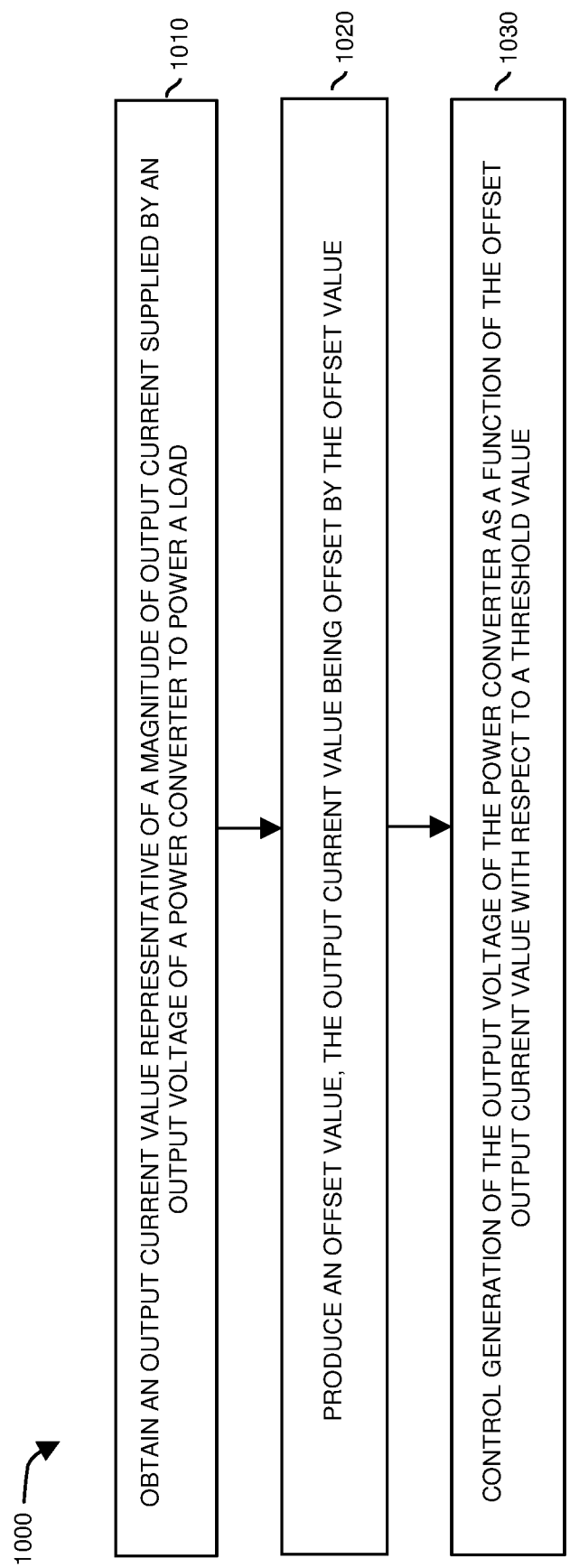
FIG. 10 is an example diagram illustrating a method according to embodiments herein.

Functionality supported by one or more resources as described herein are discussed via flowchart in FIG. 10. Note that the steps in the flowcharts below can be executed in any suitable order.

FIG. 10 is a flowchart 1000 illustrating an example method according to embodiments herein. Note that there will be some overlap with respect to concepts as discussed above.

In processing operation 1010, the main controller 140 obtains an output current value 127 representative of a magnitude of output current 122 supplied by an output voltage 123 of a power converter 165 to power a load 118.

In processing operation 1020, the offset reference generator 158 produces an offset (reference) signal 128. In one embodiment, the main controller 140 produces a current emulation signal 131 (a.k.a., offset output current signal) as a summation of the output current signal 127 and the offset reference signal 128.

In processing operation 1030, the pulse width modulation controller 141 controls generation of the output voltage 123 of the power converter 165 as a function of the output current emulation signal 131 (a.k.a., offset output current value) with respect to a threshold signal VSHARE 461 (TL1).

FIG. 11 is an example diagram illustrating implementation of a threshold level generator and related components according to embodiments herein In this example embodiment, the main controller 140-M (such as main controller associated with the master power converter phase) includes parking reference voltage generator 449, reference voltage generator 420, analog front end 410, and threshold generator 162.

The parking reference voltage generator 449 includes current source 1150, capacitor C11, capacitor C12, and switch S12.

The threshold generator 162 includes amplifier A2, transconductance amplifier G1, switch S4, switch S5, switch S6, and switch S7.

Note that switch S6 is set to an on state (SHORTED condition) for the main controller 140-M associated with the master power converter phase 165-1. The switch S6 is set to an OPEN state for the main controller 140-S associated with the slave power converter phase. In this latter instance, the main controller 140-S associated with the slave power converter phase relies on the threshold signal VSHARE signal 461 (TL1) provided by the master main controller 140-M to produce the output current powering the dynamic load 118. Thus, embodiments herein include the main controller of the master power converter phase activating switch S6 to communicate the threshold signal VSHARE 461 (TL1) from the master power converter phase to at least one slave power converter phase of the power converter.

The main controller 140-M of the master power converter phase also produces its portion of output current to power the load 118 to produce the output current powering the dynamic load 118 as a function of the output current emulation signal 131 with respect to the threshold signal SHARE 461 (TL1).

Note further that the main controller of each phase can be configured to control switching of switches in the power converter between ON and OFF states at a fixed switching frequency to convert the input voltage into the output voltage. Alternatively, the main controller can be configured to control switching at a variable switching frequency.

In this example embodiment, the main controller 140-M operates the current source 1150, switch S11, and switch S12 to produce a respective parking reference voltage 411. For example, during a startup mode, prior to implementing closed loop regulation, the main controller 140-M initially activates switch S11 and switch S12 to an ON state, resulting in the capacitor C11 being charged to the reference voltage 409 such as 700 mVDC or other suitable value.

Subsequent to the initial charging, the main converter 140-M sets switch S11 and switch S12 to OPEN state. Additionally, the main controller 140-M operates the current source 1150 to apply a respective current 1341 to charge the capacitor C12.

In one embodiment, the respective current 1341 is set at a desirable magnitude (such as a fast ramp or slows ramp setting) to monotonically increase (such as ramp up) a magnitude of the voltage on capacitor C12. In such an instance, the previously stored voltage on capacitor C11 is therefore offset with respect to the ramp voltage at node 1342. During such time, the parking reference voltage 411 starts at an initial value of 700 millivolts DC stored on the capacitors C11 and ramps to a higher voltage. As shown, the parking reference voltage 411 is inputted to the inverting input node of the amplifier A2.

As further shown, during the initial startup mode, the CLAMP signal is set to a respective logic high state in order to set respective switches S5, S6, and S7 to an ON state (SHORT condition). The CLAMPB signal is set to a respective logic low during the initial startup mode state in order to set respective switch S4 to an OFF state (OPEN condition).

In such an instance, the threshold generator 162 produces the threshold signal VSHARE 461 (TL1) to be equal to the parking reference voltage 411.

For example, the inverting input node of amplifier A2 is set to the parking reference voltage 411, which varies over time while in the startup mode. The amplifier A2 and transconductance amplifier G1 are set to a buffer mode such that the voltage at the non-inverting input node of the amplifier A2 is equal to the park reference voltage 411 applied to the inverting input node of amplifier A2. Thus, the magnitude of the threshold signal VSHARE 461 (TL1) to the noninverting input node of amplifier A2 is equal to a magnitude of the park reference voltage 411.

As previously discussed, the main controller 140-N transmits the signal level VSHARE 461 (TL1) to each of the other slave power converter phases.

In one embodiment, as further discussed below, embodiments herein include the main controller 140-M detecting a startup mode of the power converter 165. During the startup mode, the controller 140-M produces a threshold signal VSHARE 461 (TL1) having a magnitude that varies over time. Further, during the start mode, the controller 140-M controls operation of switches in the power converter as a function of the threshold signal VSHARE 461 (TL1) while the power converter 165 (and each of the multiple power converter phases) is operated in a diode emulation mode. Details of this mode are shown in FIG. 12.

FIG. 12 is an example timing diagram illustrating emulation of an output current based on sampling of an actual output current of a power converter and operation of the power converter in a diode emulation mode according to embodiments herein.

Note that the following discussion of the timing diagram 1200 and FIG. 12 and corresponding operation of the main controller 140 associated with the master power converter phase will reference FIG. 11 as well as other FIGS. Each of the power converter phases (master or slave) operates in a similar manner as discussed below. For example, as previously discussed, each of the power converter phases generates a portion of output current from the power converter as a function of the generated threshold signal (shared threshold level) and a respective magnitude of output current supplied by a respective power converter phase to a dynamic load. However, as previously discussed, only the master power converter phase produces the respective threshold signal VSHARE 461 (TL1) for use by all of the power converter phases to produce the output voltage 123 and corresponding output current 122.

Further in this example embodiment, during the startup mode between time T20 and T32, in a manner as previously discussed in FIG. 11, the main controller operates a respective power converter phase in an open loop control mode in which the controller operates the power converter phase to produce the output voltage independent of a magnitude of the output voltage between time T20 and time T32. As previously discussed, the parking reference voltage 411 provides a basis in which to control a magnitude of the output voltage 123 and corresponding output current 122 from the power converter phase.

Subsequent to the startup mode, such as after time T32, the controller operates the power converter in a closed loop mode in which the controller operates the power converter to in a so-called continuous conduction mode to produce the output voltage based on the magnitude of the output voltage with respect to a setpoint reference signal.

Also, subsequent to the startup mode, such as at or around time T31, each respective power converter phase main controller transitions the power converter phases from operation in the diode emulation mode to operation in the continuous conduction mode to convert the input voltage into the output voltage.

In this example embodiment, the main controller 140 in a respective power converter phase and slave power converter phase first detects a startup mode of a power converter operative to convert an input voltage into an output voltage at or around time T20.

During the startup mode, the controller 140 produces a threshold signal VSHARE 461 (TL1) having a magnitude that varies over time. Further, during the startup mode, the main controller 140 controls operation of switches 125 in the power converter as a function of the threshold signal VSHARE 461 (TL1) while the power converter is operated in a diode emulation mode. The operation in the diode emulation mode and generation of the output voltage 123 and corresponding output current 122 based on the threshold signal VSHARE 461 (TL1) prevents the output voltage 123 from dipping. In other words, during the start mode, the operation of the power converter in the diode emulation mode ensures that the magnitude of the output voltage monotonically increases over time.

As previously discussed, the main controller 140-M operates the current source 1150, switch S11 and switch S12 to produce a respective parking reference voltage 411 between time T20 and time T32. For example, prior to time T20, during the startup mode captured by the timing diagram 1200, the main controller 140-M initially activates switch S11 and switch S12 to an ON state, resulting in the capacitor C11 being charged to the reference voltage 409 such as 700 mVDC or other suitable value.

Subsequent to the initial charging, at or around time T20, the main converter 140-M sets switch S11 and switch S12 to OPEN (OFF) state. Additionally, the main controller 140-M operates the current source 1150 to apply a respective current 1341 to charge the capacitor C12. In one embodiment, the respective current 1341 (such as a constant or fixed magnitude of current) is set at a desirable magnitude (such as a fast ramp or slows ramp setting) to monotonically increase a magnitude of the voltage on capacitor C12 between time T20 and time T31. Between time T20 and time T31, the previously stored voltage on capacitor C11 (such as 700 millivolts DC) is therefore offset with respect to the ramp voltage (signal) at node 1342. During such time, as shown in timing diagram 1200, the parking reference voltage 411 starts at an initial value of 700 mVDC (millivolts DC) (reference voltage 421) stored on the capacitors C11 and ramps to a higher voltage. See the parking reference voltage 411 in timing diagram 1200. As previously discussed, the parking reference voltage 411 is supplied to the inverting input node of the amplifier A2 of the threshold generator 162.

As further shown, during the initial startup mode such as at least between time T20 and time T32, the CLAMP signal is set to a respective logic high state in order to set respective switches S5, S6, and S7 to an ON state (SHORT condition). The CLAMPB signal is set to a respective logic low during the initial startup mode state in order to set respective switch S4 to an OFF state (OPEN condition).

In such an instance, between time T20 and time T32, the threshold generator 162 produces the threshold signal VSHARE 461 (TL1) to be equal to the parking reference voltage 411 (ramped signal). For example, the inverting input node of amplifier A2 is set to the parking reference voltage 411, which varies over time while in the startup mode. Amplifier A2 is set to a buffer mode including respective transconductance amplifier G1 in which the output of the trans-inductance amplifier G1 sets the noninverting input node of the amplifier A2 to be equal to the park reference voltage 411. In such an instance, a magnitude of the threshold signal VSHARE 461 (TL1) outputted from the transconductance amplifier G1 is equal to a magnitude of the park reference voltage 411. This is because the amplifier A2 and transconductance amplifier G1 adjust their respective outputs such that the magnitude of the voltage at the noninverting input node of the amplifier A2 (producing threshold signal VSHARE 461 (TL1)) is equal to the magnitude of the parking reference voltage 411 applied to the inverting input node of the amplifier A2. As previously discussed, the main controller 140-N transmits the threshold signal VSHARE 461 (TL1) to each of the other slave power converter phases.

As further shown in timing diagram 1200 of FIG. 12, the main controller 140 produces the PWM signal and PWMB signal to control the respective power converter phase in a manner as previously discussed. For example, between time T20 and time T21, the main controller 140 activates the high side switch circuitry 125-1 while low side switch circuitry 125-2 is deactivated. This results in an increase in the output current 122 and corresponding output voltage 123 powering the load 118. In response to detecting that a magnitude of the output current emulation signal 131 crosses the threshold signal VSHARE 461 (TL1) at time T21, the main controller deactivates the high side switch circuitry 125-1 via setting the PWM signal to a logic low at around time T21. At time T21, the main controller 140 also activates the low side switch circuitry 125-2. This causes a magnitude of the output current 122 supplied by the respective power converter phase to decrease.

In one embodiment, as previously discussed, it is desirable to operate the power converter phases in a diode emulation mode during the initial ramping of the output voltage 123 between time T20 and time T32. The output current monitor 142 or other suitable ZCD (Zero Crossing Detector) entity monitors a magnitude of the current through the low side switch circuitry 125-2 to detect when a 0 crossing condition occurs.

At or around time T22 in this example, the current monitor 142 or other suitable entity associated with the respective power converter phase detects that the output current supplied by the respective power converter phase is approximately 0 Amps (i.e., a zero crossing condition). In such an instance, as shown in the timing diagram 1200, the main controller 140 deactivates the low side switch circuitry 125-2 between time T22 and time T23 as indicated by the signal 1254 (gate low side switch enable, when high indicates that the low side switch is enabled to an ON state, when low indicates that the low side switch is disabled to an OFF state) to prevent the magnitude of the output current 122 from the power converter phase from becoming a negative value. Preventing the output current from the respective power converter phase from becoming negative (by shutting OFF respective low side switch circuitry) helps to ensure that the magnitude of the output voltage 123 monotonically increases over time, without experiencing any dips in a magnitude of the output voltage 123.

In one embodiment, during the startup mode, the main controller monitors occurrence of a zero crossing condition with respect to the output current 122 and continues operation of the power converter in the diode emulation mode in response to detecting additional zero crossing conditions.

For example, between time T23 and time T24, the main controller 140 activates the high side switch circuitry 125-1 while low side switch circuitry 125-2 is deactivated. This results in an increase in the output current 122 and corresponding output voltage 123 powering the load 118. In response to detecting that a magnitude of the output current emulation signal 131 crosses the threshold signal VSHARE 461 (TL1) at time T24, in a similar manner as previously discussed, the main controller deactivates the high side switch circuitry 125-1 via setting the PWM signal to a logic low at around time T25. At time T25, the main controller 140 also activates the low side switch circuitry 125-2. This causes a magnitude of the output current 122 supplied by the respective power converter phase to decrease.

While the low side switch circuitry 125-2 is ON after time T24, the current monitor 142 associated with the respective power converter phase detects that the output current supplied by the respective power converter phase is again approximately 0 Amps at time T25. Time T25 corresponds to a zero crossing detection by the output current monitor 142. In such an instance, as shown in the timing diagram 1200, the main controller 140 deactivates the low side switch circuitry 125-2 between time T25 and time T26 as indicated by the signal 1254 (gate low side switch enable, when high indicates that the low side switch is enabled to an ON state, when low indicates that the low side switch is disabled to an OFF state) to prevent the magnitude of the output current 122 from the power converter phase from becoming a negative value in the corresponding control cycle. Preventing the output current from the respective power converter phase from becoming negative between time T23 and time T26 helps to ensure that the magnitude of the output voltage 123 monotonically increases over time, without experiencing any dips in a magnitude of the output voltage 123.

Between time T26 and time T27, the main controller 140 activates the high side switch circuitry 125-1 while low side switch circuitry 125-2 is deactivated. This results in an increase in the output current 122 and corresponding output voltage 123 powering the load 118. In response to detecting that a magnitude of the output current emulation signal 131 crosses the threshold signal VSHARE 461 (TL1) at time T27, the main controller deactivates the high side switch circuitry 125-1 via setting the PWM signal to a logic low at around time T27. At time T27, the main controller 140 also activates the low side switch circuitry 125-2. This causes a magnitude of the output current 122 supplied by the respective power converter phase to decrease.

While the low side switch circuitry 125-2 is ON after time T27, the current monitor 142 associated with the respective power converter phase detects that the output current supplied by the respective power converter phase is approximately 0 Amps at time T28. Time T28 corresponds to a zero crossing detection by the output current monitor 142. In such an instance, as shown in the timing diagram 1200, the main controller 140 deactivates the low side switch circuitry 125-2 between time T28 and time T29 as indicated by the signal 1254 (gate low side switch enable, when high indicates that the low side switch is enabled to an ON state, when low indicates that the low side switch is disabled to an OFF state) to prevent the magnitude of the output current 122 from the power converter phase from becoming a negative value in the corresponding control cycle. Preventing the output current from the respective power converter phase from becoming negative between time T28 and time T29 helps to ensure that the magnitude of the output voltage 123 monotonically increases over time, without experiencing any dips in a magnitude of the output voltage 123.

Between time T29 and time T30, the main controller 140 activates the high side switch circuitry 125-1 while low side switch circuitry 125-2 is deactivated. This results in an increase in the output current 122 and corresponding output voltage 123 powering the load 118. In response to detecting that a magnitude of the output current emulation signal 131 crosses the threshold signal VSHARE 461 (TL1) at time T30, the main controller deactivates the high side switch circuitry 125-1 via setting the PWM signal to a logic low at around time T30. At time T30, the main controller 140 also activates the low side switch circuitry 125-2. This causes a magnitude of the output current 122 supplied by the respective power converter phase to decrease.

While the low side switch circuitry 125-2 is ON after time T30, the current monitor 142 continues to monitor a magnitude of the output current 122 for a respective zero crossing condition. However, in this cycle, the zero crossing condition does not occur when monitoring between time T30 and time T32. Because no zero crossing condition was detecting in the respective control cycle during the diode emulation mode implemented during the startup mode between time T30 and time T32, the main controller transitions operation of the power converter from operating in the diode emulation mode to operating in a continuous conduction mode in response to detecting no zero crossing condition in a switching control cycle.

Accordingly, at time T32, the main converter sets the CLAMP signal to a logic low and CLAMPB signal to a logic high. Additionally, at or around time T32, the main controller sets the DEM signal to a logic low (indicating that the power converter is no longer operated in the diode emulation mode) and signal DEMB to a logic high. This causes a respective switchover of the switches S4, S5, and S7 to respective modes as shown in FIGS. 5B and 5C for the different types of power converter phases. These switchover to the continuous conduction mode and switching of the switches S4, S5, and S7 causes the power converter to operate in a closed loop feedback mode in which the main controller of each power converter phase produces the output voltage 123 is a function of a magnitude of the output voltage compared to the setpoint reference voltage 452.

As a further response to the switchover of respective switches S4, S5, and S7, at or around time T32, the main controller 140 activates switches S11 and S12 again to set the parking reference voltage 411 to reference voltage 409 (700 mVDC).

Thus, between time T20 and time T32, the power converter 165 operates in a ZCD start up latched mode as indicated by signal 1253. In response to detecting one or more occurrences of no zero crossing condition within a respective control cycle, the main controller switches over to operation to the continuous conduction mode. However, as shown by signal 1252, note that there may be further occurrences of zero crossing conditions after initial startup. However, subsequent to ramping the parking reference voltage 411 in detecting absence of one or more zero 0 crossing conditions, the main controller operates in the continuous conduction mode in which the low side switch circuitry is activated for a duration of time such as between time T33 and time T34, and so on, even though a zero crossing condition may occur again. In other words, after time T32, the main controller continues to operate the corresponding power converter phases in the continuous conduction mode even though a respective zero crossing condition may occur again.

FIG. 13 is an example diagram illustrating a pulse skip control technique according to embodiments herein.

In this embodiment, the main controller 140 of each power converter phase includes a pulse skip controller 1340. The pulse skip controller 1340 includes comparator 1350 and logic 1360 (such as an AND gate). During operation, the setpoint reference voltage 452 ramps during a startup mode in which the output voltage 123 starts at a low-voltage and needs to be increased to a higher target voltage value over time.

The comparator 1350 compares the magnitude of the output voltage 123 (via the output voltage feedback signal 123-FB) with respect to the setpoint reference voltage 452. In response to detecting that the magnitude of the output voltage 123 is greater than a respective setpoint reference voltage 452, the comparator 1350 generates the control signal 1351 to a logic high state (such as indicating an undesirable condition during soft start in which the magnitude of the output voltage 123 is greater than the setpoint reference voltage 452). Additionally, the logic 1360 receives signal 1355 indicating whether or not the corresponding power converter phase is operated in the diode emulation mode.

In one embodiment, if the signal 1355 is a logic high indicating that the respective power converter phase operates in the diode emulation mode (such as during startup between time T20 and time T32), and the control signal 1351 indicates that the output voltage feedback signal is greater than the setpoint reference voltage 452 (such as a soft start ramp of the setpoint reference voltage 452 during startup), the control logic 1360 produces a respective pulse skip signal 1325 at a logic high level. In such an instance, because the pulse skip signal 1325 is a logic high, the main controller 140 prevents the high side switch circuitry 125-1 from being activated to an ON state during a respective control cycle to which the pulse skip signal 1325 pertains. The prevention of activating the high side switch circuitry 125-1 for one or more corresponding control cycles in this manner reduces a rate of ramping a respective amount of output current supplied by the power converter phase to the load 118. In other words, the pulse skip controller 1340 operates to prevent a magnitude of the output voltage 123 from being greater than the respective setpoint reference voltage 452 during the soft start ramp.

Figure 14:
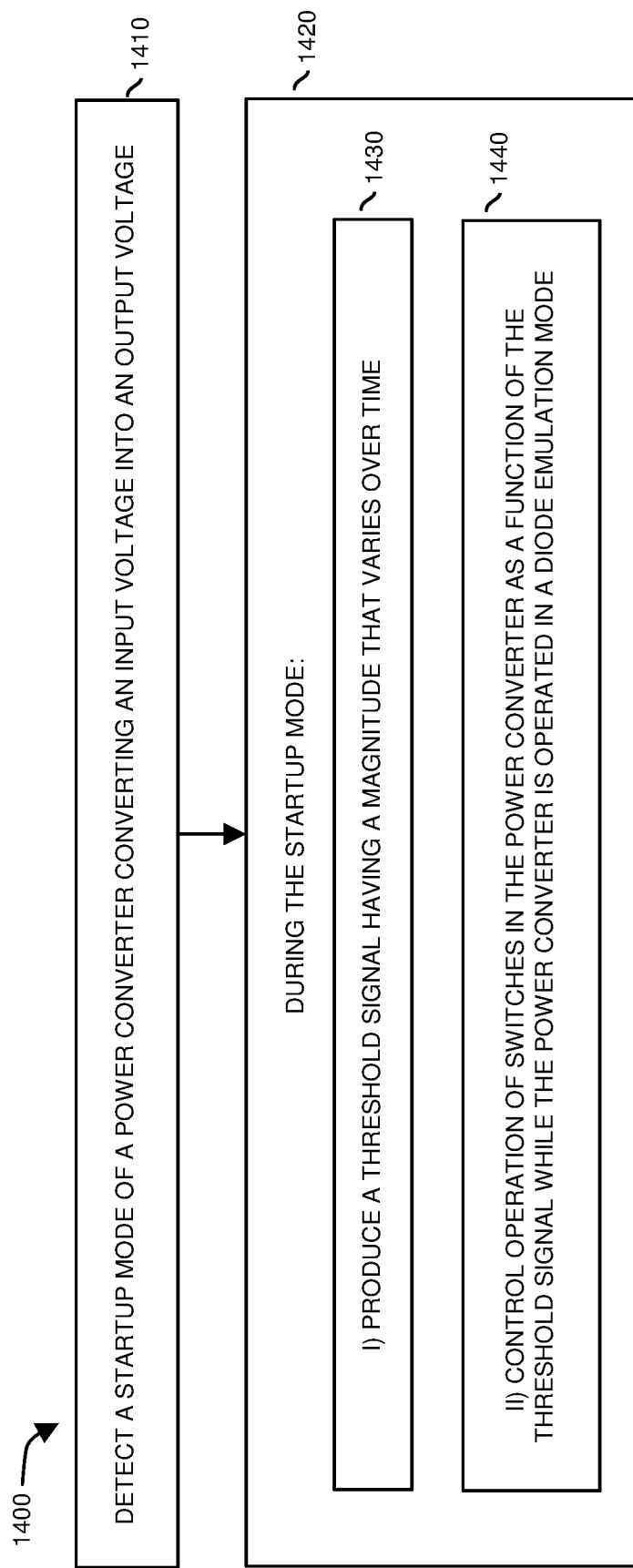
FIG. 14 is an example diagram illustrating a method according to embodiments herein.

FIG. 14 is a flowchart 1400 illustrating an example method according to embodiments herein. Note that there will be some overlap with respect to concepts as discussed above.

In processing operation 1410, the main controller 140 detects a startup mode of a power converter 165 operative to convert an input voltage 120 into an output voltage 123.

In processing operation 1420, the main controller 140 operates in the startup mode to generate the output voltage 123.

In sub-processing operation 1430, the main controller 140 controls the threshold generator 162 to produce a threshold signal VSHARE 461 (TL1) having a magnitude that varies over time.

In sub-processing operation 1440, the main controller 140 operates the power converter in a diode emulation mode. The main controller 140 controls operation of switches 125 in the power converter 165 (such as one or more power converter phases) as a function of the threshold signal TL1 (a.k.a., VSHARE signal 461).

Figure 15:
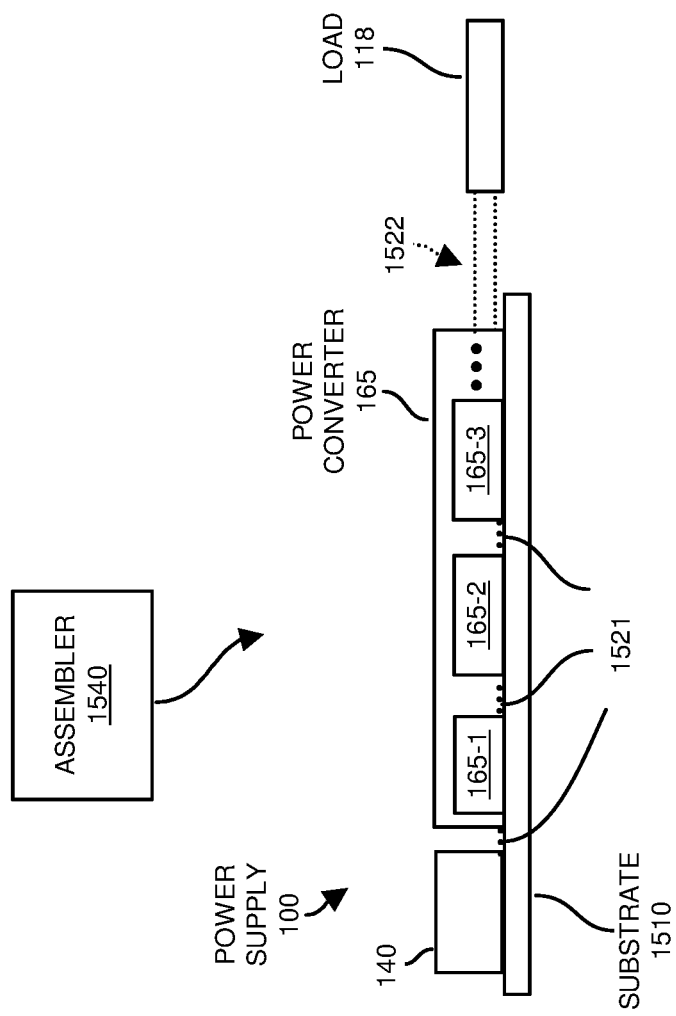
FIG. 15 is an example diagram illustrating assembly of a circuit according to embodiments herein.

FIG. 15 is an example diagram illustrating assembly of a circuit board including a current monitor and power supply monitor according to embodiments herein.

In this embodiment, assembler 1540 (a.k.a., fabricator) receives a substrate 1510 (such as a circuit board).

The assembler 1540 (a.k.a., fabricator, manufacturer, etc.) affixes (couples) the components of power supply 100 (such as main controller 140, master power converter phase 165-M, slave power converter phase 165-S, etc.) to the substrate 1510. One or more circuit paths 1521 provide connectivity between the controller 140 and the power converter phases.

Via one or more circuit paths 1522 (such as one or more traces, electrical conductors, cables, wires, etc.), the assembler 1540 or other suitable entity couples the power converters associated with the power supply 100 to the load 118. The one or more circuit paths convey respective output voltage 123 and corresponding output current 122 to the dynamic load 118.

Note that components associated with the power supply 100 such as the controller 140, power converters, etc., can be affixed or coupled to the substrate 1510 in any suitable manner. For example, each of the one or more of the components in power supply 100 can be soldered to the substrate, inserted into one or more respective sockets on the substrate 1510, etc.

Note further that the substrate 1510 is optional. If desired, the components of power supply 100 and corresponding circuit paths can be disposed in cables or other suitable resource.

Accordingly, embodiments herein include a system comprising: a substrate 1510 (such as a circuit board, standalone board, mother board, standalone board destined to be coupled to a mother board, host, etc.); a power supply 100 including corresponding components as described herein; and a load 118. As previously discussed, the load 118 is powered based on conveyance of the output voltage 123 and corresponding output current 122 over one or more paths 1522 as supplied by the power converters 111, 112, etc.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1510 or disposed at a remote location.

Note again that techniques herein are well suited for use in switching power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
detect a startup mode of a power converter converting an input voltage into an output voltage to power a load, the power converter being a transform-less power converter; and
during the startup mode: i) produce a threshold signal having a magnitude that varies over time, and ii) control operation of switches in the power converter based on comparison of an output current emulation signal to the threshold signal while the power converter is operated in a zero crossing detection mode of preventing an output current supplied by the output voltage from falling below zero, the output current emulation signal derived from a magnitude of the output current.

2. The apparatus as in claim 1, wherein the controller is further operative to:
during the startup mode, operate the power converter in an open loop control mode in which the controller operates the power converter to produce the output voltage independent of a magnitude of the output voltage; and
subsequent to the startup mode, operate the power converter in a closed loop mode in which the controller operates the power converter to produce the output voltage based on a magnitude of the output voltage with respect to a setpoint reference signal.

3. The apparatus as in claim 1, wherein the controller is further operative to:
subsequent to the startup mode, transition the power converter to operation in a continuous conduction mode to convert the input voltage into the output voltage.

4. The apparatus as in claim 1, wherein the controller is operative to:
during the startup mode:
continue operation of the power converter in the zero crossing detection mode in response to detecting a zero crossing condition.

5. The apparatus as in claim 1, wherein the controller is operative to:
transition operation of the power converter from the zero crossing detection mode to a continuous conduction mode in response to detecting no zero crossing condition in a switching control cycle of controlling the switches during the startup mode.

6. The apparatus as in claim 1, wherein the controller is operative to activate a switch in a master power converter phase of the power converter to communicate the threshold signal from the master power converter phase to at least one slave power converter phase of the power converter.

7. The apparatus as in claim 1, wherein the controller is further operative to control switching of the switches in the power converter between ON and OFF states at a fixed switching frequency to convert the input voltage into the output voltage.

8. The apparatus as in claim 1, wherein the power converter includes multiple power converter phases, each of which is operable to generate a portion of the output current from the power converter as a function of the threshold signal and a respective magnitude of output current supplied by a respective power converter phase to the load.

9. The apparatus as in claim 1, wherein the controller is further operative to:
store an output current value, the output current value representative of a sample magnitude of the output current;
apply an offset to the stored sample magnitude of the output current value to produce the threshold signal; and
supply the threshold signal to multiple power converter phases of the power converter for shared use to convert the input voltage into the output voltage.

10. A system comprising:
a circuit board;
the power converter of claim 1, the power converter fabricated on the circuit board.

11. A method comprising:
receiving a circuit board to which the load is affixed; and
fabricating the power converter of claim 1 on the circuit board.

12. The apparatus as in claim 1, wherein the controller is operative to transition high-side switch circuitry of the switches in the power converter from an ON-state to an OFF-state in response to detecting that the magnitude of the output current emulation signal crosses the threshold signal.

13. The apparatus as in claim 1, wherein the controller is further operative to:
monitor a magnitude of the output voltage with respect to a setpoint reference voltage during the startup mode; and
while in the startup mode, skip a first control cycle of multiple control cycles of activating high side switch circuitry of the switches in the power converter to produce the output voltage in response to detecting that the magnitude of the output voltage is greater than the setpoint reference voltage.

14. The apparatus as in claim 1, wherein the controller is operative to transition high side switch circuitry in the power converter from an ON state to an OFF state based on comparison of the output current emulation signal to the threshold signal, the output current emulation signal emulating the magnitude of the output current supplied by the output voltage of the power converter to the load.

15. The apparatus as in claim 1, wherein the controller is further operative to:
derive the output current emulation signal from a sample of the output current.

16. The apparatus as in claim 1, wherein the controller is further operative to:
monotonically ramp a magnitude of the output voltage from a first magnitude to a second magnitude during the startup mode.

17. The apparatus as in claim 16, wherein the threshold signal is shared by each of multiple power converter phases of the power converter to control conversion of the input voltage into the output voltage.

18. The apparatus as in claim 16, wherein the controller is operative to transition high side switch circuitry in the power converter from ON states to an OFF states based on comparison of the output current emulation signal to the threshold signal, the output current emulation signal emulating the magnitude of the output current supplied by the output voltage of the power converter to the load.

19. The apparatus as in claim 1, wherein the controller is further operative to:
prior to the startup mode, store a fixed value; and
utilize the fixed value to produce the output current emulation signal.

20. The apparatus as in claim 19, wherein the fixed value is a valley sample of the output current.

21. The apparatus as in claim 20, wherein the controller is further operative to:
apply a ramp signal to the fixed value to produce the output current emulation signal.

22. The apparatus as in claim 1, wherein the controller is further operative to:
in a first control cycle of multiple control cycles during the startup mode: i) activate high side switch circuitry of the switches in the power converter for a first portion of the first control cycle, ii) in response to detecting the magnitude of the output current emulation signal crossing the threshold signal, deactivate the high side switch circuitry and activate low side switch circuitry of the switches in the power converter for a second portion of the first control cycle, iii) in response to detecting the output current emulation signal crosses a zero current threshold level associated with the zero crossing detection mode, deactivating the low side switch circuitry for a third part of the first control cycle.

23. The apparatus as in claim 22, wherein the controller is further operative to:
in a second control cycle of the multiple control cycles during the startup mode: i) activate the high side switch circuitry of the power converter for a first portion of the second first control cycle, ii) in response to detecting the magnitude of the output current emulation signal crossing the threshold signal, deactivate the high side switch circuitry and activate the low side switch circuitry of the power converter for a second portion of the respective control cycle, iii) switching over to operating the power converter in a continuous conduction mode in response to detecting that the output current emulation signal does not cross the zero current threshold level during the second control cycle.

24. A method comprising:
detecting a startup mode of a power converter converting an input voltage into an output voltage, the power converter being a transform-less power converter;
deriving an output current emulation signal from an output current supplied by the output voltage to a load; and
during the startup mode: i) producing a threshold signal having a magnitude that varies over time, and ii) controlling operation of switches in the power converter based on comparison of the output current emulation signal to the threshold signal while the power converter is operated in a zero crossing detection mode in which the output current supplied by the output voltage is prevented from falling below zero.

25. The method as in claim 24 further comprising:
during the startup mode, operating the power converter in an open loop control mode in which the controller operates the power converter to produce the output voltage independent of a magnitude of the output voltage; and
subsequent to the startup mode, operating the power converter in a closed loop mode in which the controller operates the power converter to produce the output voltage based on the magnitude of the output voltage with respect to a setpoint reference signal.

26. The method as in claim 24 further comprising:
subsequent to the startup mode, transitioning the power converter to operation in a continuous conduction mode to convert the input voltage into the output voltage.

27. The method as in claim 24 further comprising:
during the startup mode:
continuing operation of the power converter in the zero crossing detection mode in response to detecting a zero crossing condition.

28. The method as in claim 24 further comprising:
during the startup mode:
transitioning operation of the power converter from the zero crossing detection mode to a continuous conduction mode in response to detecting no zero crossing condition in a switching control cycle of producing the output voltage.

29. The method as in claim 24 further comprising:
monotonically ramping a magnitude of the output voltage from a first magnitude to a second magnitude during the startup mode.

30. The method as in claim 29, wherein the threshold signal is shared by each of multiple power converter phases of the power converter to control conversion of the input voltage into the output voltage.

31. The method as in claim 24 further comprising:
transitioning high side switch circuitry in the power converter from ON states to an OFF states based on comparison of the output current emulation signal to the threshold signal, the output current emulation signal emulating the magnitude of the output current supplied by the output voltage of the power converter to the load.

32. The method as in claim 24 further comprising:
activating a switch in a master power converter phase of the power converter to an ON state to communicate the threshold signal from the master power converter phase to at least one slave power converter phase of the power converter.

33. The method as in claim 24 further comprising:
controlling states of switching the switches in the power converter between ON and OFF states at a fixed switching frequency to convert the input voltage into the output voltage.

34. The method as in claim 24, wherein the power converter includes multiple power converter phases, each of which is operable to generate a portion of the output current from the power converter as a function of the threshold signal and a respective magnitude of output current supplied by a respective power converter phase to the load.

35. The method as in claim 24 further comprising:
storing an output current value, the output current value representative of a sample magnitude of the output current;
applying an offset to the stored sample magnitude of the output current value to produce the threshold signal; and
supplying the threshold signal to multiple power converter phases of the power converter for shared use to convert the input voltage into the output voltage.

36. Computer-readable storage hardware having instructions stored thereon, the instructions, when carried out by computer processor hardware, cause the computer processor hardware to:
detect a startup mode of a power converter converting an input voltage into an output voltage, the power converter being a transform-less power converter; and
during the startup mode: i) produce a threshold signal having a magnitude that varies over time, and ii) control operation of switches in the power converter based on comparison of an output current emulation signal to the threshold signal while the power converter is operated in a zero crossing detection mode of preventing an output current supplied by the output voltage from falling below zero, the output current emulation signal derived from a magnitude of the output current.

* * * * *